(12) United States Patent
Le Henaff et al.

(10) Patent No.: US 12,258,027 B1
(45) Date of Patent: Mar. 25, 2025

(54) FAULT DETECTION IN VEHICLE CONTROL SYSTEMS

(71) Applicant: Zoox, Inc., Foster City, CA (US)

(72) Inventors: Anne-Claire Elisabeth Marie Le Henaff, San Francisco, CA (US); Guillermo Duenas Arana, Chicago, IL (US); David Burdick Berman, San Mateo, CA (US); Soroush Dean Khadem, Boulder, CO (US); Richard Martin Murray, Pasadena, CA (US); Daniel Miller, San Jose, CA (US); Francesco Papi, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 513 days.

(21) Appl. No.: 17/186,916

(22) Filed: Feb. 26, 2021

(51) Int. Cl.
*B60W 50/02* (2012.01)
*B60W 50/029* (2012.01)
*G06F 8/65* (2018.01)

(52) U.S. Cl.
CPC .... *B60W 50/0205* (2013.01); *B60W 50/0225* (2013.01); *B60W 50/029* (2013.01); *G06F 8/65* (2013.01); *B60W 2050/021* (2013.01); *B60W 2050/0215* (2013.01)

(58) Field of Classification Search
CPC ......... B60W 50/0205; B60W 50/0225; B60W 50/029; B60W 2050/021; B60W 2050/0215; G06F 8/65
See application file for complete search history.

(56) References Cited

U.S. PATENT DOCUMENTS

| 10,755,007 | B2* | 8/2020 | Shum ................. G06T 19/006 |
| 2006/0074558 | A1* | 4/2006 | Williamson ............ G01S 19/15 342/357.56 |
| 2017/0139411 | A1* | 5/2017 | Hartung ................. H04L 12/40 |
| 2019/0354643 | A1* | 11/2019 | Shum ..................... G06F 30/20 |
| 2020/0134494 | A1* | 4/2020 | Venkatadri ............. G06N 3/045 |

(Continued)

OTHER PUBLICATIONS

Y. Jeong et al., "Vehicle sensor and actuator fault detection algorithm for automated vehicles," 2015 IEEE Intelligent Vehicles Symposium (IV), Seoul, Korea (South), 2015, pp. 927-932. (Year: 2015).*

(Continued)

*Primary Examiner* — Joan T Goodbody
(74) *Attorney, Agent, or Firm* — Lee & Hayes, P.C.

(57) ABSTRACT

An evaluation computing system may implement techniques to validate a vehicle controller, such as based on an update thereto. The evaluation computing system may access data associated with an operation of the vehicle in an environment as controlled by the controller. The evaluation computing system may modify a portion of the data representative of a fault associated with the controller. The evaluation computing system may run a simulation utilizing modified log data to determine whether the controller detects and/or mitigates the fault within a threshold time. Based on a determination that the controller does not detect and/or mitigate the fault within the threshold time, the evaluation computing system may determine an error associated with the controller. Based on a determination that the controller detects and/or mitigates the fault within the threshold time, the evaluation computing system may validate the controller.

20 Claims, 7 Drawing Sheets

(56) References Cited

U.S. PATENT DOCUMENTS

2020/0339140 A1* 10/2020 Lin .................... B60W 10/04
2020/0410062 A1* 12/2020 O'Malley ........... B60W 60/001

OTHER PUBLICATIONS

Sung K, Min KW, Choi J, Kim BC. A Formal and Quantifiable Log Analysis Framework for Test Driving of Autonomous Vehicles. Sensors (Basel). Mar. 2, 2020;20(5): 1356. (Year: 2020).*

Sung K, Min KW, Choi J, Kim Bc. A Formal and Quantifiable Log Analysis Framework for Test Driving of Autonomous Vehicles. Sensors (Basel). Mar. 2, 2020;20(5):1356. (Year: 2017).*

A. Stocco, M. Weiss, M. Calzana and P. Tonella, "Misbehaviour Prediction for Autonomous Driving Systems," 2020 IEEE/ACM 42nd International Conference on Software Engineering (ICSE), Seoul, Korea (South), 2020, pp. 359-371. (Year: 2020).*

* cited by examiner

FAULT DETECTION IN VEHICLE CONTROL SYSTEMS

BACKGROUND

Vehicles are increasingly supplementing or replacing manual functionality with automatic controls. Autonomous and/or semi-autonomous driving, however, can require use of computing systems capable of making split-second decisions to respond to myriad events and scenarios. The computing systems, such as the software and/or hardware associated therewith, may be updated, such as to optimize performance of vehicle and/or computing system operations. Prior to incorporating an update into a vehicle, the efficacy of the updated system may be confirmed via simulations, such as to evaluate a performance of the updated system as compared to a previous version. These simulations may test whether the updated system performs differently than the previous version. However, merely determining a difference in performance does not necessarily indicate whether the updated system is configured to detect and mitigate faults that may arise in the operation of the autonomous or semi-autonomous system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
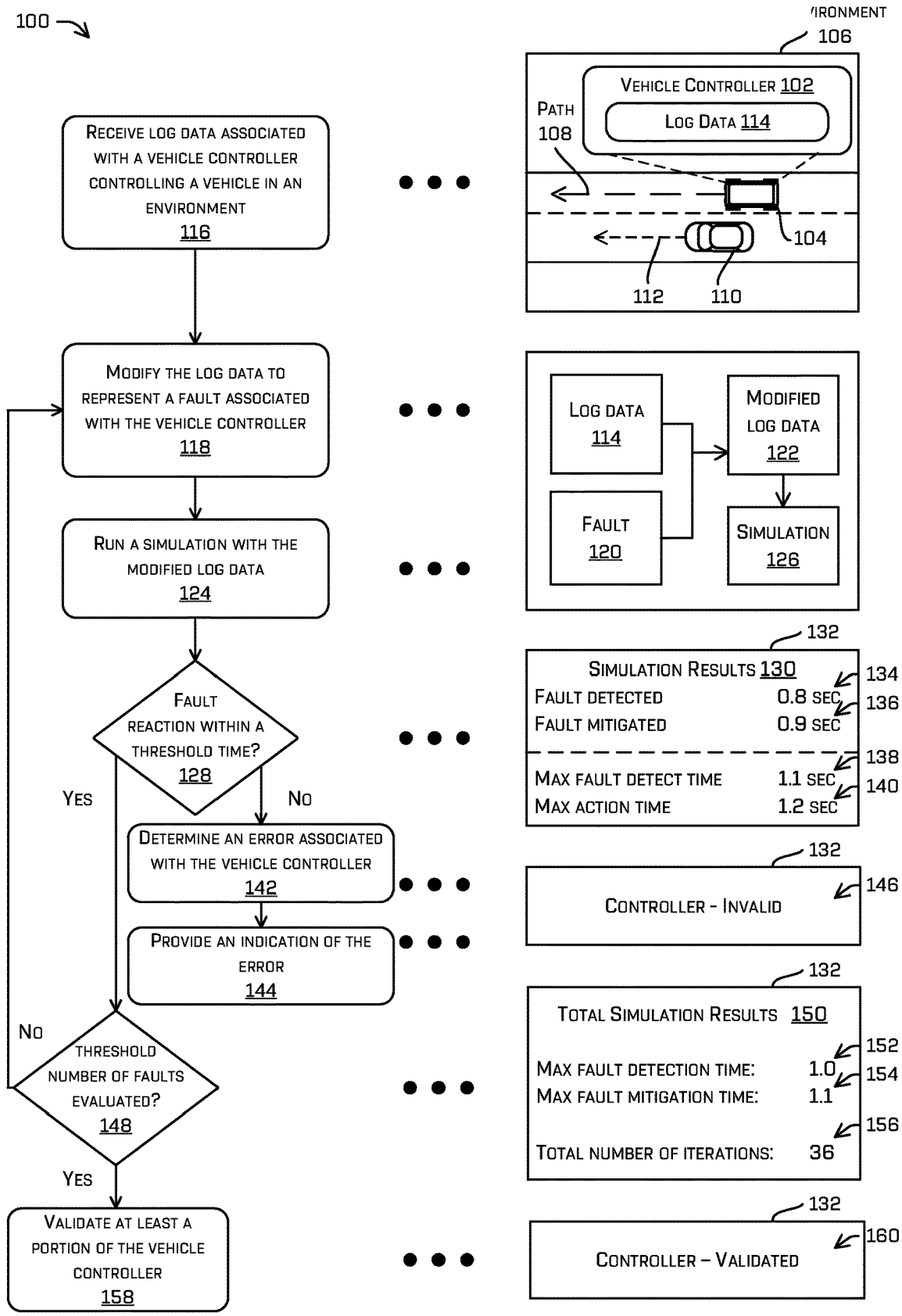
FIG. 1 depicts an example process for evaluating a performance of a vehicle controller in detecting an introduced fault, in accordance with examples of the disclosure.

This application relates to techniques for introducing a fault into a controller of a vehicle and running a simulation to evaluate a performance the vehicle controller in detecting and mitigating the fault. The vehicle controller may include an autonomous controller configured to control one or more functionalities of an autonomous and/or semi-autonomous vehicle (e.g., a vehicle). An evaluation computing system may receive log data associated with a previous operation of the vehicle controller controlling a vehicle in an environment. The evaluation computing system may modify a portion of the log data to represent a fault associated with a component of the vehicle controller and run a simulation with the modified log data to determine a performance of the vehicle controller and/or component thereof. The evaluation computing system may be configured to iteratively modify the log data to represent a plurality of faults and run simulations with each of the plurality of faults. Based on a determination that the vehicle controller and/or the component does not detect and/or mitigate the faults within a threshold period of time, the evaluation computing system may determine an error associated with the vehicle controller and/or the component. Based on a determination that the vehicle controller and/or the component detects and/or mitigates the faults within the threshold period of time, the evaluation computing system may validate the vehicle controller and/or component thereof. In some examples, responsive to validation, the vehicle controller and/or the component may be incorporated into the vehicle.

In various examples, the evaluation computing system may determine to evaluate a performance of a vehicle controller or component thereof. The evaluation may be performed periodically, such as daily, weekly, or the like, and/or may be performed in response to a triggering event, such as when the vehicle is out of service, when the vehicle is charging, when the vehicle is being serviced, when requested by a technician or administrator, or the like. In such examples, the evaluation computing system may be configured to validate updates (e.g., software, hardware, etc.) made to the vehicle controller or the component between evaluations. For example, one or more developers may update different portions of code associated with a vehicle controller throughout a workday. The evaluation computing system may be configured to evaluate the performance of the updated vehicle controller daily (or at other regular or irregular intervals) to verify that the updated vehicle controller operates within parameters, such as prior to incorporating the updated vehicle controller in a vehicle.

In various examples, the evaluation computing system may evaluate the performance of the vehicle controller based on a request to validate the vehicle controller or the component. In some examples, the request may be received, such as from a user computing device, responsive to an update to the vehicle controller or the component. For example, a software developer may modify a code associated with a localization component of the vehicle controller. The software developer may submit a request to validate the updated localization component (e.g., vehicle controller), such as to verify that the updated localization component will operate within parameters (e.g., detect and/or mitigate a fault within a threshold time).

In various examples, the evaluation computing system may be configured to determine an update to the vehicle controller and automatically evaluate the updated vehicle controller based on the update. In some examples, the evaluation computing system may determine the update based on metadata associated with the vehicle controller or component thereof. The metadata may include a label (e.g., a name, a version, etc.), a timestamp (e.g., last saved, last updated, etc.), or the like. In some examples, the evaluation computing system may continuously and/or periodically (e.g., hourly, daily, etc.) evaluate the metadata for changes from a previous version of the vehicle controller and/or the component. Based on a determination that the metadata represents an update to the vehicle controller and/or the component, the evaluation computing system may automatically determine to evaluate the updated vehicle controller and/or the updated component.

In some examples, based on a determination to evaluate the updated vehicle controller and/or the updated component, the evaluation computing system may access log data associated with a previous operation of the vehicle controller controlling a vehicle in an environment. The log data may represent data input into the components and/or subcomponents of the vehicle controller, such as from one or more sensors of the vehicle or from an upstream component and/or an upstream subcomponent (e.g., component or subcomponent that receives and processes data prior to a particular component or subcomponent). Additionally, the log data may include data output (e.g., processed) by the components and/or the subcomponents, such as based on the input data. For example, the log data may include sensor data captured by one or more sensors of the vehicle and utilized by the vehicle controller to determine a location of the vehicle and a trajectory for the vehicle to travel through the environment, as well as control signals used to control the vehicle according to the trajectory.

In at least one example, the components of the vehicle controller may include a perception component, a localization component, a prediction component, and a planner component. In some examples, each component of the vehicle controller may include one or more subcomponents that are individually modifiable, such as in an update to software associated therewith. As a non-limiting example, the localization component may include a global position solver, a smooth position solver, and a state solver, each of which being configured to be updated, such as by a software developer. Though examples associated with the subcomponents of the localization component are described throughout this disclosure, this is not intended to be so limiting and a person skilled in the art understands that other components of the vehicle controller (e.g., perception component, prediction component, planner component, etc.) may include various subcomponents that may be modified and/or evaluated utilizing the techniques described herein.

In various examples, the evaluation computing system may access the log data and may modify the log data to generate modified log data. In some examples, the modified log data may represent a fault in one or more components and/or subcomponents of the vehicle controller and/or the vehicle. In some examples, the modified log data may represent a faulty input and/or output associated with a component and/or subcomponent of the vehicle controller. For example, the modified log data may include a modification to sensor data captured by a sensor of the vehicle and indicative of a failure of the sensor. The evaluation computing system may utilize the modified log data to evaluate the performance of at least a portion of the vehicle controller in detecting the sensor failure. For another example, the modified log data may include a modification to an output of a state solver of a localization component that is indicative of an error in a determined location of the vehicle. The evaluation computing system may utilize the modified log data to evaluate a performance of another component of the vehicle controller in detecting and/or mitigating the fault of the localization component.

In various examples, the evaluation computing system may run a simulation of the vehicle controller and/or the associated component (e.g., updated vehicle controller, vehicle controller with an updated component or subcomponent, etc.) utilizing the modified log data. In some examples, the evaluation computing system may determine whether the vehicle controller or the associated component detected the fault associated with the modified log data within a first threshold time (e.g., 0.5 seconds, 1.1 seconds, etc.). In some examples, the evaluation computing system may determine whether the vehicle controller or the associated component mitigated the fault within a second threshold time (e.g., 0.7 seconds, 1.2 seconds, etc.). Based on a determination that the vehicle controller and/or the associated component did not detect and/or mitigate the fault within respective threshold times, the evaluation computing system may determine an error with the vehicle controller and/or the associated component.

Based on a determination that the vehicle controller and/or the associated component detected and/or mitigated the fault within the respective threshold times, the evaluation computing system may iteratively modify the log data to represent different faults associated with the vehicle controller and/or the associated component. The iterative modifications to the log data may represent step faults (e.g., increase values by a determined amount), ramp faults (e.g., gradual increase or decrease in magnitude), component failures (e.g., staleness, freezing (e.g., no data output), etc.), and/or noise. For example, a first fault may include a first small modification to a value associated with sensor data captured by a particular sensor and a second fault may include a second, larger modification to the value associated with the sensor data.

In some examples, the iterative modifications to the log data may represent faults associated with different components or subcomponents. In such examples, each iterative modification may include a modification to the original log data associated with the different components or subcomponents. For example, a first fault may include a first modification to sensor data input into a smooth position solver of a localization component and a second fault may include a second modification to an output of a global position solver of the localization component. The evaluation system may thus evaluate the performance of different subcomponents of a component in detecting and mitigating different faults, such as to validate the component as a whole.

In various examples, the evaluation system may iteratively modify the log data representative of a plurality of faults of different magnitudes and/or associated with different components and/or subcomponents until a threshold number of faults have been tested. The threshold number of faults may be determined based on the vehicle controller or associated component (or subcomponent) being evaluated. For example, a first threshold number of faults may be evaluated to validate a localization component and a second threshold number of faults may be evaluated to validate a perception system.

Based on a determination that the threshold number of faults have been evaluated and that the vehicle controller and/or the associated component operate within parameters, the evaluation computing system may validate the vehicle controller and/or the associated component. In some examples, the evaluation computing system may generate and provide an indication of validation, such as via a user interface. In some examples, the indication of validation maybe provided based on a request for evaluation of the vehicle controller and/or the associated component. In such examples, the evaluation computing system may provide the indication of validation to a computing device associated with the requestor. In some examples, the evaluation computing system may cause the indication of validation to be presented via a user interface associated with the computing device of the requestor.

In various examples, based on a determination, during the iterative modification process, that the vehicle controller and/or the associated component does not operate within parameters, the evaluation computing system may generate an indication of invalidation. In some examples, the indication of invalidation may include results associated with the iterative modification process, such as times associated with detection and/or mitigation of the faults associated therewith. In some examples, the indication of invalidation may include a performance of each component and/or subcomponent of the vehicle controller tested during the iterative modification process. In such examples, data associated with a failure of a particular component and/or subcomponent of the vehicle controller may be provided and/or emphasized (e.g., highlighted, red flag or other indicator) in the indication of invalidation.

The techniques discussed herein may improve the functioning of an autonomous and/or semi-autonomous vehicle in many ways. For example, the techniques discussed herein may provide simulations for testing a performance of a version of vehicle controller, to ensure that the version of the vehicle controller may safely operate in a dynamic environment. For another example, the techniques described herein may readily validate the operation of a vehicle controller, such as after a software upgrade has been implemented.

Furthermore, the techniques described herein can provide a means by which a user may evaluate performance of a particular component of a vehicle controller. Additionally, the user may limit a number and/or percentage of faults tested in the evaluation. By limiting an evaluation to the particular component and/or to a number and/or percentage of faults to be tested, the techniques described herein can reduce an amount of processing power and/or memory required to run a particular simulation. Accordingly, the techniques described herein improve the functioning of the evaluation computing device.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an example process 100 for evaluating a performance of a vehicle controller 102 in detecting an introduced fault, in accordance with examples of the disclosure. The vehicle controller 102 may be configured to control one or more functionalities of a vehicle 104 operating in an environment 106. In at least one example, the vehicle controller 102 may include an autonomous controller configured to control functionalities of an autonomous and/or semi-autonomous vehicle.

The vehicle controller 102 may include a one or more components and/or subcomponents configured to assist in controlling the vehicle 104 along a path 108, to determine an action for the vehicle 104 to take, such as in response to events (e.g., traffic light turns red, vehicle approaches stop sign, etc.) and/or objects 110 (e.g., static and dynamic objects) in the environment 106. As non-limiting examples, the vehicle controller 102 may include a perception component, a localization component, a prediction component, a planner component, a tracker component, and low-level controllers. The perception component may be configured to perform object detection, segmentation, and/or classification. The localization component may be configured to determine a location and orientation of the vehicle 104 in the environment 106. The prediction component may be configured to determine one or more object trajectories 112 associated with predicted paths of detected objects 110. The planner component may be configured to determine one or more vehicle trajectories associated with traveling from the location along a route to a destination. The planner component may additionally be configured to determine actions for the vehicle 104 to take based on detected objects and/or potential interactions between the vehicle 104 and the detected objects. The tracker component may be configured to determine a position and/or orientation of the vehicle with respect to a planned trajectory, such as based on steering angles, velocities, accelerations, drive direction, drive gear, and/or gravity acceleration. The low-level controllers may be configured to control a drive system of the vehicle 104 to cause the vehicle 104 to travel according to a determined trajectory.

In various examples, the vehicle controller 102 may control the vehicle 104 utilizing sensor data captured by one or more sensors on the vehicle 104 and/or one or more remote sensors (e.g., on another vehicle, mounted in the environment, etc.). The sensor(s) may include inertial sensors (e.g., IMU, steering angle, wheel sensors, other motion detectors, etc.), vision sensors (e.g., cameras, lidar, radar, etc.), and/or other sensors (e.g., microphone, GPS, etc.). In various examples, the vehicle controller 102 may control the vehicle 104 based on object data associated with one or more detected objects 110 in the environment. The object data may include an object location, an object type or classification (e.g., car, truck, pedestrian, bicyclist, etc.), and/or a predicted object trajectory of the object 110. For example, the vehicle controller 102 may be configured to detect a double-parked vehicle (DPV) located in a planned path of the vehicle. The vehicle controller 102 may be configured to determine a viable route (e.g., route clear of other obstacles) around the DPV. Responsive to determining the viable route, the vehicle controller 102 may control the vehicle along the viable route around the DPV, such as by utilizing one or more drive systems.

Due in part to the complexity of the vehicle controller 102 and the components and subcomponents associated therewith, the vehicle controller 102 may be periodically updated. In some examples, the vehicle controller 102 may be updated to optimize a performance thereof. For example, a software developer may refactor a portion of code associated with the vehicle controller 102, such as to reduce latency associated with the portion of code. In various examples, an evaluation computing system may be configured to evaluate a performance of the updated vehicle controller (e.g., with the refactored code) prior to sending the updated vehicle controller to the vehicle 104, such as ensure the update causes the vehicle 104 to operate within one or more operating parameters.

In various examples, the vehicle controller 102 may be configured to store log data 114 associated with the control of the vehicle 104 through the environment 106. The log data 114 may represent inputs into the components and/or subcomponents (e.g., sensor input (e.g., raw and/or processed sensor data), corrections (e.g., global position corrections, etc.), etc.) and outputs of the components and/or the subcomponents. That is, the log data 114 may represent the data input into a component and/or subcomponent and the resulting output based on the component and/or subcomponent processing the input data. In various examples, the vehicle controller 102 may cause the log data 114 to be continuously or periodically sent to a remote computing device associated with an evaluation computing system, such as for storage and/or further processing. In at least one example, the log data 114 may be accessible to the evaluation computing system for running one or more simulations to validate an updated vehicle controller.

At operation 116, the evaluation computing system may receive the log data 114 associated with the vehicle controller 102 controlling the vehicle 104 in the environment 106. As discussed above, the log data 114 may be received from the vehicle controller 102, such as in a periodic upload of data to the remote computing device associated with the evaluation computing system. In some examples, remote computing device may store the log data 114 in a datastore as historical data associated with the vehicle controller 102. In various examples, the evaluation computing system may be configured to access and/or receive the log data 114 in a datastore associated with the evaluation computing system (e.g., remote computing device), such as via a call or query.

In various examples, the evaluation computing system may determine to evaluate a performance of the updated vehicle controller in controlling a simulated vehicle in a particular scenario. The scenario may include a straight road, a curved (e.g., left curve, right curve, degree of curvature, etc.), cambered road, smooth road, rough road, a hill (e.g., uphill operation, downhill operation, etc.), a junction (e.g., intersection), object interactions (e.g., detection and reaction to objects), highway operations (e.g., above a threshold speed), urban operations, or the like. In some examples, the evaluation computing system may determine the scenario based on input from a user, such as a user requesting the evaluation. In some examples, the evaluation computing system may determine the scenario based on the update to the vehicle controller 102. For example, the update may include a software update associated with vehicle handling in a right curve. The evaluation computing system may access log data associated with the vehicle controller 102 controlling the vehicle 104 in a right curve. In some examples, the evaluation computing system may determine the scenario based on a default setting. For example, the default setting may include vehicle 104 operation on a straight road.

At operation 118, the evaluation computing system may modify the log data 114 to represent a fault 120 associated with the vehicle controller. The evaluation computing system may modify the log data 114 by changing a value associated with at least one component thereof, the different value being representative of the fault 120. In some examples, the modified log data 122 may represent a faulty input and/or output associated with one or more components and/or subcomponents of the vehicle controller. For example, the modified log data 122 may include a modification to sensor data captured by a sensor of the vehicle and indicative of a failure of the sensor. The evaluation computing system may utilize the modified log data 122 to evaluate the performance of at least a portion of the vehicle controller 102 in detecting the sensor failure. For another example, the modified log data 122 may include a modification to an output of a state solver of a localization component that is indicative of an error in a determined location of the vehicle 104. The evaluation computing system may utilize the modified log data 122 to evaluate a performance of another component of the vehicle controller in detecting and/or mitigating the fault of the localization component.

In various examples, the fault 120 may include a magnitude and/or a duration. The duration may include a time that the fault 120 is applied to a particular component. In some examples, the duration may be based on the particular component and/or subcomponent associated with the fault 120. The magnitude may include a value associated with the fault 120. In some examples, the magnitude may be determined based on a scale of error associated with the fault 120. For example, a first magnitude may represent a large error associated with a sensor output (e.g., input into a localization component) and a second magnitude may represent a small error associated with the sensor output.

In some examples, the magnitude may be determined based on the component and/or subcomponent associated with the fault 120. For example, the evaluation computing system may modify the log data 114 to inject a constant offset in an IMU yaw rate of 1.7 degrees per second. In such an example, the magnitude of the fault 120 may be 1.7 degrees per second. For another example, the evaluation computing system may modify the log data 114 to inject a lateral drift in a smooth position solver of a localization component of 0.2 meters per second. Though these are merely illustrative examples and are not intended to be so limiting.

In some examples, the magnitude of the injected fault 120 may be determined based on a type of fault 120 being introduced. The evaluation computing system may be configured to introduce step faults (e.g., step increase or decrease in magnitude), ramp faults (e.g., gradual increase or decrease in magnitude), component failures (e.g., staleness), and/or noise. In some examples, the evaluation computing system may be configured to iteratively modify log data 114 at different magnitudes, such as to represent the step fault, the ramp fault, the component failure, and/or the noise (e.g., increasing or decreasing amount). In such examples, the evaluation computing system may determine the magnitude for a particular modification based on a previous modification and/or a type of fault (e.g., step, ramp, staleness, noise, etc.). For example, the evaluation computing system may determine to introduce a ramp fault in a wheel speed sensor. A first modification may include an increase in a particular wheel speed by 0.2 meters per second. The evaluation computing system may generate first modified log data 122 by modifying a value of the log data 114 associated with the particular wheel by increasing the value by 0.2. The evaluation computing system may then, in a second iterative test, generate second modified log data 122 by modifying a value of the log data 114 associated with the particular wheel by increasing the value by 0.3 (0.1 meters per second greater than the first modified log data 122). For another example, the evaluation computing system may determine to introduce a step fault in an inertial measurement unit (IMU). The evaluation computing system may generate modified log data 122 by modifying values of the log data 114 associated with the IMU by 3 (e.g., increase all values by 3, decrease all values by 3, etc.).

In various examples, the evaluation computing system may be configured to sweep through different magnitudes of faults 120 associated with various components, such as in iterative modifications to the log data 114. In some examples, the different magnitudes may be determined based on the simulated failing component. For example, an IMU may include a self-report error value at or above which the IMU will generate an error message indicating the failing component. The evaluation computing system may determine to iteratively test faults 120 of the IMU at values above zero and below the self-report error value. In some examples, the evaluation computing system may increase values in a stepwise function throughout the iterative modifications to the log data 114.

At operation 124, the evaluation computing system may run a simulation 126 with the modified log data 122. In some examples, the simulation may include a simulation of a particular component being tested. For example, the evaluation computing system may be configured to introduce a plurality of faults 120 into various subcomponents of a localization component to evaluate the performance of the localization component in response to each of the plurality of faults 120. In various examples, the simulation 126 may include a simulation of the autonomous controller controlling a simulated vehicle based on the modified log data 122. In such examples, the evaluation computing system may evaluate the performance of a particular component being tested (e.g., localization component from the example above) and the performance of each component located downstream of the particular component being tested. In at least one example, the evaluation computing system may be configured to evaluate the performance of one or more components of the updated vehicle controller in detecting and/or mitigating the fault 120.

At operation 128, the evaluation computing system may determine whether a reaction of the autonomous controller to the fault 120 occurs within a threshold time. In some examples, the evaluation system may determine whether the autonomous controller detected the fault within a first threshold time. The first threshold time may include a maximum time permitted for detecting faults 120 in a system (e.g., fault detection time threshold). In various examples, the evaluation computing system may compare log data 114 to the modified log data 122 to determine an error associated with a component. For example, the evaluation computing system evaluating a performance of localization component may determine a corrupted output of the localization component (e.g., position data of the vehicle) based on the modified log data 122. The evaluation computing system may then compare the output based on the modified log data 122 to the reference output of the localization component included in the log data 114 to determine the error of the localization component (e.g., position error). The evaluation computing system may input the error into a planner component of the vehicle controller (e.g., next component downstream of the localization component) in the simulation to determine a fault detection time associated with the planner component detecting the error.

In various examples, the evaluation computing system may be configured to determine the first threshold time (e.g., fault detection time threshold) based on pre-determined operating parameters associated with the vehicle. In various examples, the fault detection time threshold may include the time associated with an exceedance of an operating parameter. For example, an operating parameter may include maintaining a vehicle position within 40 centimeters of a center of a lane (e.g., lateral limit). The evaluation computing system may determine a time associated with a particular fault 120 that corresponds to the vehicle exceeding the 40-centimeter lateral limit and may set the time as the fault detection time threshold with regard to the particular fault 120. In some examples, the fault detection time threshold may be associated with a smallest time associated with the exceedance of multiple operating parameters. In such examples, the fault detection time threshold may represent a maximum time for detecting a fault 120 without the vehicle exceeding an operating parameter. The fault detection time threshold determination will be discussed in greater detail below with regard to FIG. 3.

Additionally or in the alternative, the evaluation system may determine whether the autonomous controller mitigated the fault 120 within a second threshold time. The second threshold time may include a maximum time permitted for mitigating the fault 120. Fault mitigation may include slowing the vehicle below a threshold speed, stopping the vehicle, parking the vehicle off a road, or the like. In some examples, the fault mitigation may include one or more actions taken by the autonomous controller to remove the simulated vehicle from operation in the environment based on the fault (e.g., until the fault can be remedied).

In some examples, the evaluation computing system may be configured to provide simulation results 130 to a computing device. The computing device may include a remote computing device associated with the evaluation computing system and/or a user computing device associated with a requestor of the evaluation (e.g., user computing device from which a request to validate a component of the autonomous controller is received). In various examples, the evaluation computing system may be configured to cause the simulation results 130 to be presented via a user interface 132 on the computing device. In the illustrative example, the simulation results 130 include a first time associated with fault detection 134, a second time associated with fault mitigation 136, a fault detection time threshold 138, and a fault mitigation time threshold 140, though this is not intended to be limiting and the simulation results 130 may include additional or alternative data. For example, the simulation results 130 may include indications of threshold exceedance, a component associated with the evaluation, a component associated with fault detection and/or mitigation, or the like.

In some examples, the simulation results 130 may include graphical depictions of vehicle behavior resulting from the fault 120, such as a lateral deviation, a longitudinal deviation, detected errors, biases (e.g., gyro bias, acceleration bias, etc.), residuals, and the like. In such examples, the simulation results 130 may provide a visual indication of vehicular behavior based on the introduced fault 120.

Based on a determination that the fault reaction did not occur within the threshold time (e.g., the fault was not detected within a fault detection time threshold, the fault was not mitigated within a fault mitigation time threshold, etc.), the evaluation computing system, at operation 142, determines an error associated with the vehicle controller. At operation 144, the evaluation computing system may provide an indication of the error via the computing device, such as via the user interface 132. In some examples, the indication of the error may include an indication of invalidity 146 of the vehicle controller and/or the component associated with the evaluation.

Based on a determination that the fault reaction did occur within the threshold time (e.g., the fault was detected within the fault detection time threshold, the fault was mitigated within the fault mitigation time threshold, etc.), the evaluation computing system, at operation 148, determines whether a threshold number of faults are evaluated. As discussed above, the evaluation computing system may be configured to iteratively modify the log data 114 and run simulations 126 with different modified log data 122 to evaluate the updated vehicle controller and/or a component thereof. Each iteration may include at least one fault 120 of a particular magnitude and duration. For example, a first iteration may include first modified log data 122 with IMU values increased by 1, a second iteration may include second modified log data 122 with IMU values increased by 2, and so on. The evaluation computing system may run a first simulation with the first modified log data 122 and a second simulation with the second modified log data 122, and so on, until the threshold number of faults are evaluated.

In various examples, the threshold number of faults may be determined based on the component and/or subcomponent of the vehicle controller to be tested. For example, an evaluation of a localization component may include a first plurality of faults 120 and an evaluation of a perception component may include a second plurality of faults 120. In some examples, the threshold number of faults 120 may include a set of faults 120 that may occur in the operation of the vehicle. For example, the set of faults 120 may represent a slow degradation of an IMU. For another example, the set of faults 120 may represent failures of various subcomponents of a component.

In some examples, the threshold number of faults 120 may include a pre-determined number of faults 120 (e.g., 5, 10, 12, etc.) of different magnitudes that are introduced into a particular component and/or subcomponent. For example, an evaluation of a smooth position solver of a localization component may include iterations of faults 120 associated with inertial or other sensors (IMU, wheel speeds, steering angle, vision systems, LIDAR (Light Detection and Ranging), etc.), the sensor data from which is input into the smooth position solver, and corrections inputs provided by the global position solver to correct an IMU bias. The evaluation computing system may determine to iteratively modify the log data to represent six (6) different faults 120 of varying magnitudes and/or duration associated with each inertial sensor and the corrections inputs. Though this is merely provided as an illustrative example, and the evaluation computing system may determine to iteratively modify the log data 114 a greater or lesser amount.

Additionally, in some examples, the evaluation computing system may determine a first pre-determined number of iterations associated with a first input and a second pre-determined number of iterations associated with a second input. For example, in an evaluation of the smooth position solver, the evaluation computing system may determine to iteratively modify the log data to represent ten (10) different faults 120 associated with a first inertial sensor, eight (8) different faults 120 associated with a second inertial sensor, and seven (7) different faults 120 associated with the corrections input.

In various examples, the evaluation computing system may provide total simulation results 150 associated with the iterative modifications. In the illustrative example, the total simulation results 150 may include a maximum fault detection time 152, a maximum fault mitigation time 154 associated with each of the faults 120 introduced during the evaluation of the vehicle controller and/or associated component, and a total number of iterations 156 associated with the evaluation. In some examples, the total simulation results 150 may include data associated with one or more of the simulation results 130. In some examples, the total simulation results 150 may include data associated with the maximum detected deviation from the log data 114 reference. In some examples, the total simulation results 150 may include a maximum detected deviation associated with vehicle behavior. In such examples, the total simulation results 150 may include graphical depictions of the maximum detected deviation associated with the vehicle behavior.

Based on a determination that the threshold number of faults have been evaluated ("Yes" at operation 148), the evaluation computing system, at operation 158, may validate an updated vehicle controller and/or component thereof. In some examples, the evaluation computing system may cause an indication of validity 160 to be presented on the computing device, such as via the user interface 132. In some examples, responsive to receiving the indication of validity 160, the computing device may cause the updated vehicle controller and/or component thereof to be incorporated into the vehicle 104.

Using the disclosed techniques, the robustness of a vehicle's autonomous systems can be characterized and/or tested. For example, a fault can be injected into an individual sensor or sensor modality for use in autonomous driving (e.g., for perception of the environment of the vehicle). The vehicle may include a plurality of sensors and/or sensor modalities. The techniques can be used to characterize or verify a perception or other component of the vehicle which may use multiple sensors or modalities. For example, the ability of a perception system to correctly characterize an object in an environment despite the loss or corruption of certain sensor(s) or modalities can be characterized. As another example, the ability of an autonomous vehicle to accurately detect its pose within an environment can be characterized despite the aforementioned corruption.

Figure 2:
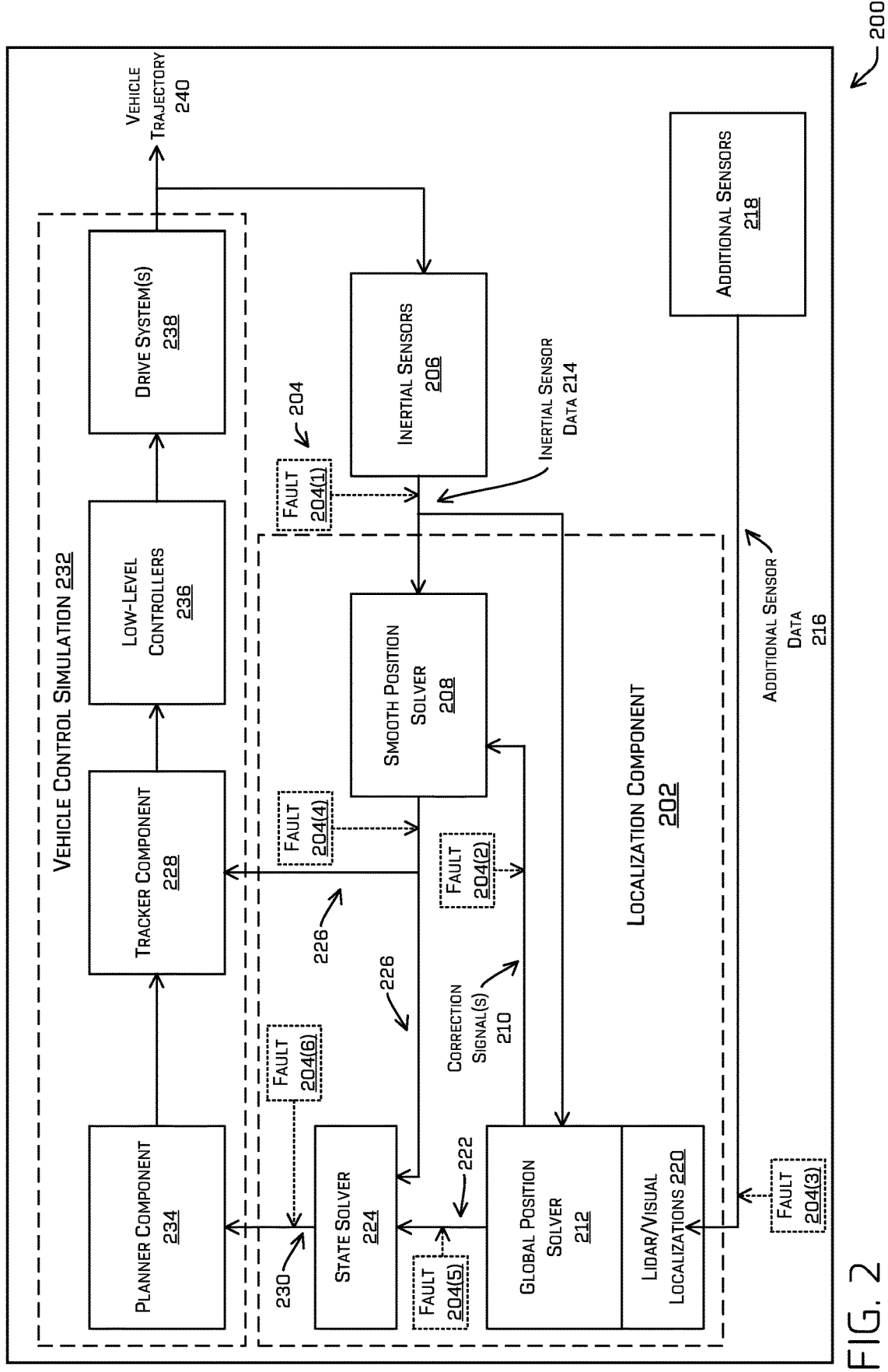
FIG. 2 is a block diagram of example components of a vehicle controller associated with testing a localization component of the vehicle controller by injecting a fault into the localization component and determining a time associated with a detection of the fault, in accordance with examples of the disclosure.

FIG. 2 is a block diagram of example components of a vehicle controller 200 and associated data flows therebetween during an evaluation of a localization component 202 of the vehicle controller 200. As discussed above, an evaluation computing system may evaluate a performance of the localization component 202 by injecting one or more faults 204 into the localization component 202 and determining a time associated with a detection of the fault(s) 204, in accordance with examples of the disclosure. The fault(s) 204 may include modification to log data associated with a previous operation of the vehicle controller 200 (e.g., a previous version) controlling a vehicle in an environment. That is, the fault(s) 204 may be represented by modified log data.

In some examples, the localization component 202 may include an updated localization component 202. In such examples, the evaluation computing system may evaluate the localization component 202 to ensure proper operation thereof prior to incorporating into a vehicle. In some examples, the localization component 202 may include a version of the localization component 202 currently being operated in a vehicle, such as to determine a position and/or orientation of the vehicle while being controlled by the vehicle controller 200. In such examples, the evaluation computing system may be configured to evaluate a performance of the localization component 202 in handling a particular fault 204 that may be encountered during vehicle operation. For example, a new IMU may be incorporated into the vehicle with different operating parameters than a previous IMU. The evaluation computing system may evaluate the performance of the localization component 202 with respect to the new IMU.

In various examples, the evaluation computing system may determine the fault(s) 204 to introduce. The fault(s) 204 may represent a faulty input into a component and/or subcomponent and/or a faulty output of a component and/or subcomponent. For example, a first fault 204(1) may represent an error associated with an inertial sensor 206 that is input into a smooth position solver 208 and a second fault 204(2) may represent an error associated with one or more correction signals 210 output by a global position solver 212 and input into the smooth position solver 208. The correction signal(s) 210 may represent estimations of biases of one or more inertial sensors 206 provided to the smooth position solver 208 to correct for positional drift introduced during operation inertial sensor(s) 206. As discussed above, the fault(s) 204 may represented by modified log data. For example, the first fault 204(1) may be represented by modified inertial sensor data 214 and the second fault 204(2) may be represented by modified correction signal(s) 210.

In various examples, each fault 204 may include a magnitude and duration. The evaluation computing system may be configured to iteratively evaluate a plurality of faults 204 of varying magnitudes and durations. In some examples, the magnitudes and durations may be determined based on the component being evaluated and/or the subcomponent associated with the fault 204 (e.g., subcomponent receiving the modified log data, subcomponent outputting the modified log data).

In various examples, the magnitudes and/or durations may be determined based on a step wise failure of a component and/or subcomponent. In such examples, the modified log data associated with the faults 204 may include step increases or decreases in the magnitude and/or duration of the faults 204 in each iteration. In some examples, the magnitudes and/or durations may be determined based on a ramp failure of the component and/or subcomponent. In such examples, the modified log data may include a gradual increase and/or decrease in the magnitude and/or duration of the faults 204 in each iteration. In some examples, the magnitude and/or duration may be determined based on a complete failure of a component (e.g., staleness). In such examples, the magnitude and/or duration may be determined based on a failure of the component and/or subcomponent to provide updated data. The complete failure may be represented by an output magnitude of 0 or by an unchanging output value (e.g., modified log data remains the same magnitude and the actual log data changes in magnitude). In various examples, the magnitudes and/or durations of the fault(s) 204 may be determined based on an introduction of noise into the system.

As illustrated in FIG. 2, during an evaluation of the localization component 202, the evaluation computing system may introduce a plurality of faults 204, such as the first fault 204(1), the second fault 204(2), a third fault 204(3), a fourth fault 204(4), a fifth fault 204(5), and a sixth fault 204(6). Although represented as individual faults 204, the first fault 204(1), the second fault 204(2), the third fault 204(3), the fourth fault 204(4), the fifth fault 204(5), and the sixth fault 204(6) may represent a plurality of faults 204 of different magnitudes and/or a plurality of different faults, each of which being introduced in a different iteration of the test. For example, the evaluation computing system may modify inertial sensor data 214 representative of a first fault 204(1) of a first magnitude and may run a first simulation of the vehicle controller 200 with the first fault 204(1) at the first magnitude. The evaluation computing system may then modify the inertial sensor data 214 representative of the first fault 204(1) of a second magnitude and may run a second simulation of the vehicle controller 200, and so on. For another example, the evaluation computing system may modify inertial sensor data 214 representative of a first fault 204(1) of an IMU and may run a first simulation of the vehicle controller 200 with the first fault 204(1) associated with the IMU. The evaluation computing system may then modify the inertial sensor data 214 representative of a first fault 204(1) of a wheel speed sensor and may run a second simulation of the vehicle controller 200 with the first fault 204(1) associated with the wheel speed sensor.

In various examples, the evaluation computing system may determine a number of iterations to run with respect to a particular fault 204. In such examples, the evaluation computing system may determine a number of different magnitudes and/or durations associated with the particular fault 204. In some examples, the number of iterations may be based on a particular subcomponent to be evaluated (e.g., an updated subcomponent or portion thereof). In some examples, the number of iterations may include a predetermined number of magnitudes of faults to be tested with regard to a particular subcomponent. For example, the evaluation computing system may determine to test six (6) faults associated with IMU sensor data, twelve (12) faults associated with wheel sensor data, and seven (7) faults associated with steering angle sensor data. The evaluation computing system may modify the inertial sensor data 214 and run a simulation with each of the 25 faults, such as to evaluate the performance of the localization component 202 and/or the smooth position solver 208 thereof. As used herein, the smooth position solver 208 may include a high frequency subcomponent (e.g., 100 Hertz, 200 Hertz, etc.) configured to determine a location of a vehicle operating in an environment based at least in part on inertial sensor data 214 captured by inertial sensors 206.

In some examples, the number of iterations may be determined based on design characteristics of the associated sensor and/or subcomponent. For example, an IMU may include a self-report error value at or above which the IMU will generate an error message indicating the failing component. The evaluation computing system may determine to iteratively test faults 204 of the IMU at values above zero and below the self-report error value. The evaluation computing system may determine the number of iterations based on the magnitude of the self-report error value. In some examples, the number of iterations may be based on particular identified types of faults (e.g., step, ramp, staleness, noise, etc.) to be included in the evaluation. Continuing the example from above, the evaluation computing system may gradually increase the magnitude of an IMU fault 204 between 0 and the self-report error value. The evaluation computing system may determine the number of iterations based on the ramp fault and/or the design characteristics of the IMU.

In some examples, the evaluation computing system may determine particular faults 204 that are likely to be encountered while operating in an environment and may determine the number of iterations and/or types of faults 204 to be introduced based on the particular faults 204. For example, the evaluation computing system may determine that during the winter it may be common for a wheel speed sensor to provide erroneous data due to the associated wheel driving through a puddle. The evaluation computing system may determine to evaluate the performance of the localization component in processing data indicative of erroneous wheel speed sensor data.

In various examples, the evaluation computing system may determine one or more of the first fault 204(1), the second fault 204(2), the third fault 204(3), the fourth fault 204(4), the fifth fault 204(5), and/or the sixth fault 204(6) to introduce during an evaluation of the localization component 202. In some examples, the evaluation of the localization component 202 may include an evaluation of a modification to a subcomponent thereof. In such examples, the evaluation computing system may determine the fault(s) 204 to introduce during the evaluation. For example, the evaluation computing system may receive an indication that a smooth position solver 208 has been updated, such as in a request to evaluate the performance of the smooth position solver 208 prior to incorporating on vehicle. The evaluation computing system may determine to introduce one or more first faults 204(1), one or more second faults 204(2), and one or more third fault 204(3) and run simulations with each of the first fault(s) 204(1), the second fault(s) 204(2), and the third fault(s) 204(3), introducing a one or more different faults in each iteration.

In some examples, the evaluation computing system may introduce a single fault 204 representative of a single failure of a component and/or subcomponent in each iteration. In some examples, the evaluation computing system may introduce two or more faults 204 in each iteration, representative of failures of different components at a same time. For example, the evaluation computing system may modify an inertial sensor data 214 representative of a first fault 204(1) and may modify additional sensor data 216 (log data) captured by one or more additional sensors 218 representative of a third fault 204(3).

In some examples, the additional sensors may include vision sensors, such as lidar, radar, camera sensors, and the like and/or location sensors (e.g., GPS, etc.). In at least one example, the additional sensor data 216 captured by the additional sensors 218 may be utilized by the localization component to determine lidar and/or visual localizations 220. Though not illustrated in FIG. 2, the localization component 202 may additionally utilize map data to determine the lidar and/or visual localizations 220. In various examples, the lidar and/or visual localizations 220 may be incorporated into a global position solver 212 to determine a global position of the vehicle in an environment. In at least one example, modified additional sensor data 216 may be input into the lidar and/or visual localizations 220 representative of the third fault 204(3). In some examples, the third fault 204(3) may be indicative of a fault in one of the additional sensors. For example, the third fault 204(3) may represent a modification to a point cloud generated by a lidar sensor. For another example, the third fault 204(3) may represent a modification to a GPS location provided by a GPS sensor.

In some examples, the global position solver 212 may include a low frequency system (e.g., 10 Hertz, 15 Hertz, 30 Hertz, etc.) configured to determine a position of the vehicle based on visual data. In various examples, the global position solver 212 may provide a global position output 222 of the global position to a state solver 224 and a second output, correction signals 210 configured to correct for biases in the inertial sensors 206, to the smooth position solver 208.

In various examples, the evaluation computing system may determine to introduce one or more fifth faults 204(5) in the global position output 222. In such examples, the global position output 222 may include modified log data representative of the fifth fault 204(5). In some examples, the evaluation computing system may determine to introduce one or more fourth faults 204(4) comprising modified log data of a smooth position output 226. In various examples, the smooth position output 226 may include a location of the vehicle determined based on the inertial sensor data 214. The smooth position output 226 may be input into the state solver 224 along with the global position output 222. In various examples, the smooth position output 226 may additionally be input into a tracker component 228.

As illustrated, the global position output 222 and the smooth position output 226 may be input into the state solver 224 to determine a final location of the vehicle, as determined by the localization component 202. In some examples, the global position output 222 and/or the smooth position output 226 may include modified log data, such as representative of a fault 204 introduced downstream. In some examples, the global position output 222 and the smooth position output 226 may represent log data. In such examples, the evaluation computing system may introduce a sixth fault 204(6) by modifying log data output by the state solver 224. The modified state solver output 230 may represent an introduced fault 204(6) or error in the location of the vehicle.

In various examples, the evaluation computing system may input the state solver output 230 (e.g., output of the state solver 224 including an introduced fault 204) into a vehicle control simulation 232, such as to determine a reaction to the introduced fault 204. In the illustrative example, the state solver output 230 may be input into a planner component 234 configured to determine a path, such as path 108, for the vehicle to follow to traverse through an environment, such as environment 106. In various examples, planner component 234 may be configured to determine one or more trajectories for the vehicle to travel along the path. In various examples, a fault may be detected by the planner component 234, such as based on an unexpected jump in position data provided by the localization component 202, or the like.

The vehicle control simulation 232 may include a tracker component 228 configured to determine a position and/or orientation of the vehicle with respect to a trajectory determined by the planner component 234, such as based on steering angles, velocities, accelerations, drive direction, drive gear, and/or gravity acceleration. In various examples, the tracker component 228 may receive the smooth position output 226, such as to provide a check or feedback on the data input from the planner component 234. In various examples, a fault 204 may be detected based on a difference between the smooth position output 226 and the data input from the planner component 234.

Additionally or in the alternative, a fault 204 may be detected by one or more subcomponents of the localization component 202 downstream of the sensor or subcomponent associated with the fault 204. For example, the state solver 224 may detect the fault 204 based on a disparity between the smooth position output 226 and the global position output 222. In various examples, the evaluation computing system may determine whether a fault detection time is less than a threshold fault detection time. Based on a determination that the fault detection time is less than the threshold fault detection time, the evaluation computing system may determine that the vehicle controller and/or the localization component 202 performs within operating parameters.

Based on a determination that the fault detection time is equal to or greater than the threshold fault detection time, the evaluation computing system may determine that the vehicle controller and/or the localization component 202 does not perform within operating parameters. In some examples, the evaluation computing system may generate an indication of invalidity associated with the vehicle controller and/or the localization component 202. In some examples, the indication of invalidity may include data associated with the fault 204 introduced, the subcomponent associated therewith, the fault detection time, and/or the threshold fault detection time.

In various examples, regardless of whether the fault 204 is detected within the threshold fault detection time, the vehicle control simulation 232 may continue the simulation, such as to determine downstream effects of the fault 204 on a final state of the vehicle, such as compared to the log data. In various examples, the tracker component 228 may output data to one or more low-level controllers 236 of the vehicle. In some examples, the low-level controllers 236 may include an electronic control unit of the vehicle configured to control one or more systems to cause the vehicle to traverse through the environment. For example, the low-level controllers 236 may provide signals the one or more drive systems 238 to cause the vehicle to travel according to a vehicle trajectory 240, perform an action, or the like. In various examples, the evaluation computing system may run the simulation through each component of the vehicle control simulation 232, such as to determine a total impact and/or effect of the fault 204 on the vehicle, as propagated through a vehicle controller.

In various examples, the evaluation computing system may determine a fault detection time and/or a fault mitigation time associated with each fault 204 introduced (e.g., each iterative modification, each simulation, etc.). In various examples, the fault mitigation time may be determined based on an action determined by the planner component 234 based on the state solver output 230. In some examples, the planner component 234 may determine to modify a trajectory based on a detected fault. The modified trajectory may include a reduced speed below a threshold speed, slowing to a stop, pulling off a road, or otherwise getting the vehicle clear of other traffic. As discussed above with regard to FIG. 1, the evaluation computing system may determine whether a fault mitigation time is less than a threshold fault mitigation time. Based on a determination that the fault mitigation time is less that the threshold fault mitigation time, the evaluation computing system may determine that the vehicle controller performs within operating parameters.

Based on a determination that the fault mitigation time is equal to or greater than the threshold fault mitigation time, the evaluation computing system may determine that the vehicle controller does not perform within operating parameters. In some examples, based on a determination that the vehicle controller is not within operating parameters, the evaluation computing system may provide an indication of invalidity associated with the vehicle controller. In some examples, the indication of invalidity may include an operating parameter that is exceeded and/or a fault 204 associated therewith.

Figure 3:
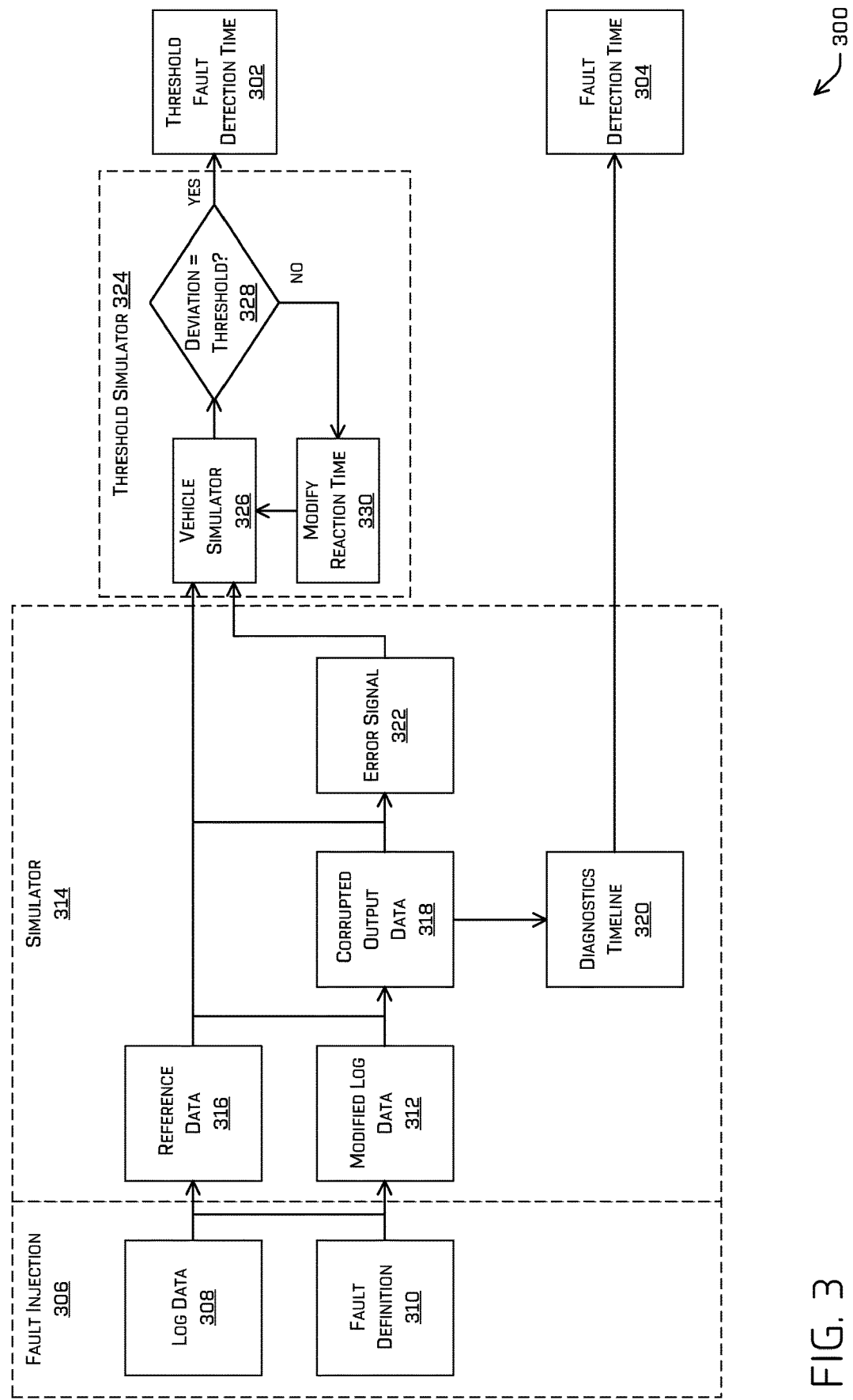
FIG. 3 is a block diagram of example data flows associated with determining a threshold fault detection time associated with a component of a vehicle controller and an actual fault detection time associated with the vehicle controller detecting the fault.

FIG. 3 is an example system 300 for determining a threshold fault detection time 302 associated with a component of a vehicle controller and an actual fault detection time 304 associated with the vehicle controller detecting the fault. As discussed above, an evaluation computing system may be configured to perform a fault injection 306 on log data 308. The log data 308 may include data associated with the vehicle controller controlling a vehicle in an environment. In at least one example, the log data 308 may include historical data associated with the vehicular operation in the environment, such as determined trajectories, actual trajectories traveled, detected objects, predicted trajectories of objects, actual trajectories of objects, and the like.

In various examples, the fault injection 306 may include modifying the log data 308 according to a fault definition 310. The fault definition 310 may include a particular portion of log data 308 to be modified. In some examples, the particular portion of log data 308 may be determined based on an input and/or output of a component and/or subcomponent of the vehicle controller. In some examples, the particular portion of log data 308 may be determined based on the component and/or subcomponent being evaluated. For example, the evaluation computing system may determine to evaluate a state solver of a localization component 202, such as state solver 224 of FIG. 2, and may modify an output of a smooth position solver, such as smooth position solver 208, to represent a fault in the smooth position output.

The fault definition 310 may include a magnitude and/or duration of the fault. As discussed above, the magnitude and/or duration of the fault may be determined based on the component and/or subcomponent of the vehicle controller associated with the fault. For example, the magnitude and/or duration may be determined based on the fault being associated with a correction signal input into a smooth position solver of a localization component. In some examples, the magnitude and/or duration may be determined based on a type of fault applied. The faults may include a step fault, a ramp fault, a staleness fault (e.g., frozen or failed component), and/or noise. In some examples, the magnitude and/or duration may be determined based on an initial value of a first fault to be applied and subsequent values based on the type of fault. For example, a first fault may include an initial modification to the log data by a value of 1 in a first iteration (e.g., first simulation) and a second fault may include a modification to the log data by a value of 3 in a second iteration, representative of a step fault.

Based on the modification to the log data 308 based on the fault definition 310 during the fault injection 306, the evaluation computing system may input modified log data 312 into a simulator 314 to run a simulation based on the modified log data 312. The simulator 314 may simulate how the vehicle controller and/or portion thereof reacts to the fault. In some examples, the simulator 314 determines how the vehicle controller and/or portion thereof reacts to the fault in comparison to the reference data 316. In at least one example, the simulator 314 generates corrupted output data 318. The corrupted output data 318 may represent data processed by one or more components of the vehicle controller downstream of the introduced fault (e.g., after the modified log data). For example, a fault, such as fault 204(1) may be introduced into inertial sensor data and input into a smooth position solver of a localization component, such as smooth position solver 208. The smooth position solver 208 may process the inertial sensor data including the fault and may output corrupted output data 318.

In some examples, the corrupted output data 318 may be utilized by the simulator 314 to determine a diagnostics timeline 320 associated with the fault. The diagnostics timeline may represent a first time associated with the input of the fault into the vehicle controller and a second time associated with a detection of the fault. The difference between the first time and the second time may represent the fault detection time 304.

In various examples, the simulator 314 may compare the corrupted output data 318 to the reference data 316 to determine the error signal 322. The error signal 322 may represent a total error associated with a component of the vehicle controller based on the introduced fault. For example, the error signal 322 may represent a difference between a reference position of a vehicle actually determined by a state solver of a vehicle during vehicle operation and a corrupted output of a state solver based on the fault. That is, the error signal 322 may represent a total position error associated with the state solver of the localization component. For another example, in an evaluation of a localization component of a vehicle controller, the evaluation computing system may compare a reference trajectory associated with the reference data 316 (e.g., based on log data 308) to a corrupted trajectory (e.g., corrupted output data 318) generated based on the modified log data 312. The evaluation computing system may utilize the comparison to determine position errors associated with a smooth position solver and a global position solver of the localization component.

In various examples, the simulator 314 may provide the reference data 316 and/or the error signal 322 to a threshold simulator 324 configured to determine one or more thresholds associated with operating parameters of the vehicle controller and/or an associated component. The threshold simulator 324 may include a vehicle simulator 326 configured to iteratively test faults in a loop to determine the threshold fault detection time 302.

In various examples, the vehicle simulator 326 may receive the reference data 316 and the error signal 322 and may perform a simulation by controlling a simulated vehicle based at least in part on the error signal 322 and/or the reference data 316. The vehicle simulator 326 may determine, at operation 328, whether a deviation of the vehicle is equal to a threshold (e.g., maximum) deviation. The threshold deviation may be determined based on one or more operating parameters associated with vehicle operation that are stored in association with the threshold simulator 324. In some examples, the operating parameter(s) may include predetermined behaviors to ensure a safe operation of the vehicle. For example, an operating parameter may include maintaining a position within 40 centimeters of a center of a lane. For another example, an operating parameter may include maintaining a speed associated with a determined trajectory within 0.5 meters per second.

The deviation may represent a difference between a location, orientation, velocity, acceleration, or the like of the vehicle (e.g., actual state of the vehicle in operation based on the reference data 316) and the corresponding state of the vehicle based on the corrupted data (e.g., error signal 322). For example, the vehicle controller may control the vehicle according to a trajectory that tracks a center of a lane. The deviation may include a lateral deviation from the center of the lane.

In various examples, based on a determination that the deviation is not equal to the threshold deviation (e.g., "No" at operation 328), the threshold simulator 324 may modify a reaction time 330. In examples in which the deviation in the simulation exceeds the threshold deviation, modifying the reaction time 330 includes a decrease in the reaction time. In examples in which the deviation in the simulation is less than the threshold deviation, modifying the reaction time includes an increase in the reaction time. A modification (e.g., increase or decrease) of the reaction time may be input into the vehicle simulator 326 to run another simulation with the modified reaction time. The threshold simulator 324 may iteratively run simulations until the deviation is equal to the threshold deviation at operation 328. In some examples, the threshold fault detection time 302 may include a time associated with the deviation being equal to the threshold, such as that determined at operation 328. In some examples, the threshold fault detection time 302 may include the time associated with the deviation being equal to the threshold deviation minus a safety For example, the time associated with a vehicle exceeding 40 centimeters from the center of the lane may be 1.2 seconds. The threshold simulator 324 and/or evaluation computing system may determine to set the threshold fault detection time 302 at 1.1 seconds, to provide a 0.1 second safety buffer, such as to maximize the safe operation of the vehicle.

Figure 4:
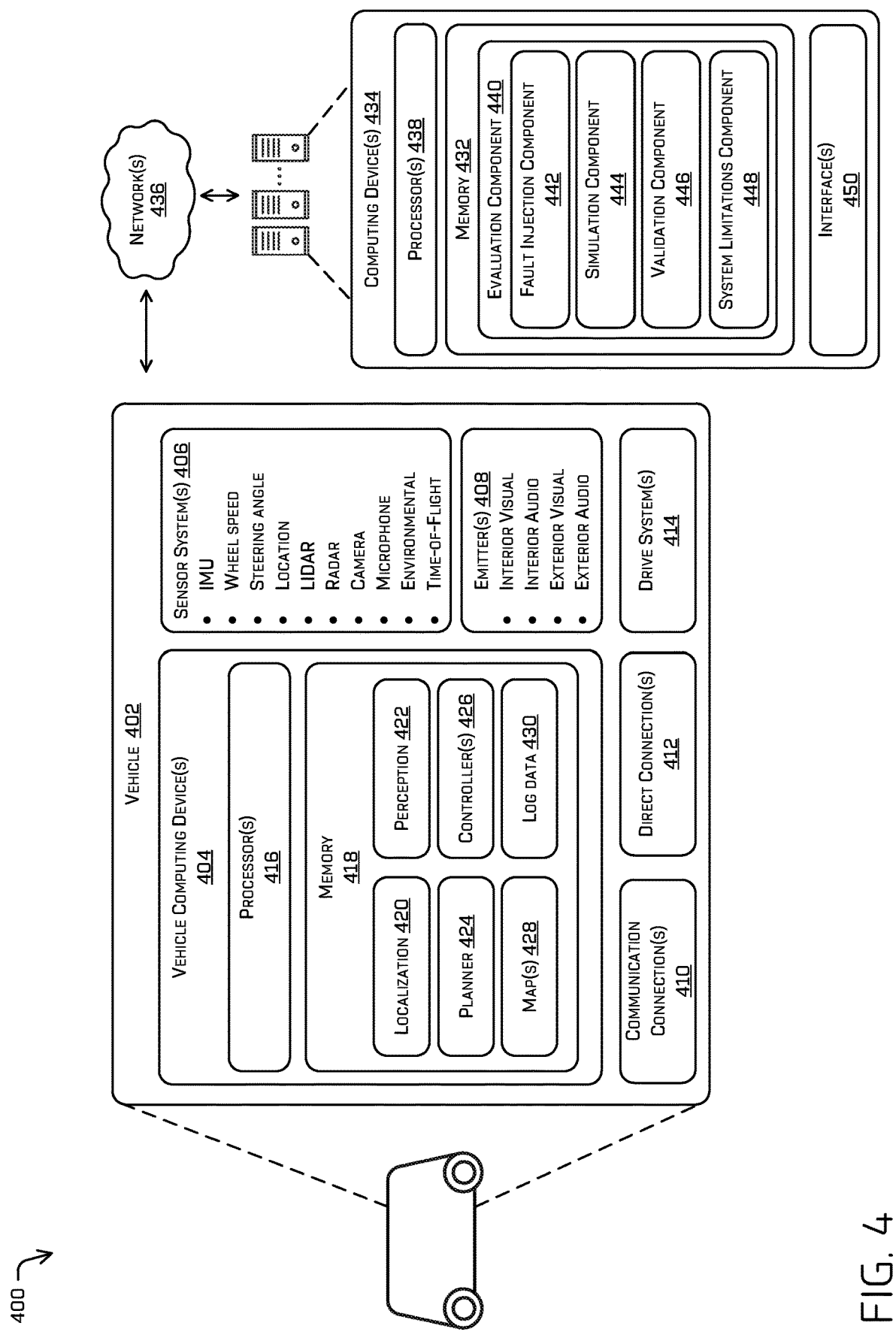
FIG. 4 is a block diagram of an example system for implementing the techniques described herein.

FIG. 4 is a block diagram of an example system 400 for implementing the techniques described herein. In at least one example, the system 400 may include a vehicle 402, such as vehicle 104.

The vehicle 402 may include a vehicle computing device 404, one or more sensor systems 406, such as inertial sensor(s) 206 and/or additional sensors 218, one or more emitters 408, one or more communication connections 410, at least one direct connection 412, and one or more drive systems 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device 404 stores a localization component 420, such as localization component 202, a perception component 422, a planner component 424, such as planner component 234, one or more system controllers 426 (e.g., low-level controllers 236), one or more maps 428, and log data 430. Though depicted in FIG. 4 as residing in the memory 418 for illustrative purposes, it is contemplated that the localization component 420, the perception component 422, the planner component 424, the system controller(s) 426, and the map (s (428 may additionally, or alternatively, be accessible to the vehicle 402 (e.g., stored on, or otherwise accessible by, memory remote from the vehicle 402, such as, for example, on memory 432 of a remote computing device 434). As described herein, the localization component 420, the perception component 422, the planner component 424, the system controller(s) 426, may be collectively comprise a vehicle controller, such as vehicle controller 102.

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for generating a path polygon associated with the vehicle path, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.).

In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.).

In additional or alternative examples, the perception component 422 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 424 may determine a path for the vehicle 402 to follow to traverse through an environment. For example, the planner component 424 may determine various routes and trajectories and various levels of detail. For example, the planner component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 424 may generate an instruction for guiding the vehicle 402 along at least a portion of the route from the first location to the second location. In at least one example, the planner component 424 may determine how to guide the vehicle 402 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planner component 424 may include a prediction component to generate predicted trajectories of objects in an environment. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing device(s) 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the maps 428. That is, the maps 428 may be used in connection with the localization component 420, the perception component 422, and/or the planner component 424 to determine a location of the vehicle 402, detect objects in an environment, and/or generate routes and/or trajectories to navigate within an environment. Additionally, in some examples, the maps 428 may be used in connection with a tracker component, such as tracker component 228, to determine a position and/or orientation of the vehicle with respect to a planned trajectory, such as based on steering angles, velocities, accelerations, drive direction, drive gear, and/or gravity acceleration.

In some examples, the one or more maps 428 may be stored on a remote computing device(s) (such as the computing device(s) 434) accessible via network(s) 436. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the memory 418 may store log data 430. The log data 430 may represent data input and/or output by each of the localization component 420, the perception component 422, the planner component 424, the controller(s) 426, and/or outputs of various subcomponents thereof. In at least one example the log data 430 may include sensor data captured and provided to one or more of the components of the vehicle computing device(s) 404 by the sensor systems 406.

As can be understood, the components discussed herein (e.g., the localization component 420, the perception component 422, the planner component 424, the one or more system controllers 426, and the one or more maps 428 are described as divided for illustrative purposes. However, the operations performed by the various components may be combined or performed in any other component. For example, in the illustrative example, the functions of a tracker component as described above may be performed by the planner component 424. However, in other examples, the tracker component may include a separate component independent of the planner component 424.

In some instances, aspects of some or all of the components discussed herein may include any models, techniques, and/or machine learning techniques. For example, in some instances, the components in the memory 418 (and the memory 432, discussed below) may be implemented as a neural network.

As described herein, an exemplary neural network is a biologically inspired technique which passes input data through a series of connected layers to produce an output. Each layer in a neural network may also comprise another neural network or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally or alternatively, the sensor system(s) 406 may send sensor data, via the one or more networks 436, to the one or more computing device(s) 434 at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connection(s) 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device(s) 434, other nearby vehicles, etc.) and/or one or more remote sensor system(s) for receiving sensor data.

The communications connection(s) 410 may include physical and/or logical interfaces for connecting the vehicle computing device 404 to another computing device or a network, such as network(s) 436. For example, the communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration associated with the drive systems, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle 402. In some instances, the direct connection 412 may further releasably secure the drive system(s) 414 to the body of the vehicle 402.

In at least one example, the localization component 420, the perception component 422, the planner component 424, and/or the one or more system controllers 426, and/or various components thereof, may process sensor data, as described above, and may send their respective outputs as log data 430, over the one or more network(s) 436, to the computing device(s) 434. In at least one example, the vehicle computing device(s) 404 may send the log data 430 to the computing device(s) 434 at a particular frequency, after a lapse of a predetermined period of time, in near real-time, etc.

In some examples, the vehicle 402 may send sensor data to the computing device(s) 434 via the network(s) 436. In some examples, the vehicle 402 may receive sensor data from the computing device(s) 434 via the network(s) 436. The sensor data may include raw sensor data and/or processed sensor data and/or representations of sensor data. In some examples, the sensor data (raw or processed) may be sent and/or received as one or more log files.

The computing device(s) 434 may include processor(s) 438 and a memory 432 storing an evaluation component 440. The evaluation component 440 (e.g., evaluation computing system) of the computing device(s) 434 may be configured to evaluate the performance of a vehicle controller, as described above with regard to FIGS. 1-3.

In the illustrative example, the evaluation component 440 may include a fault injection component 442, a simulation component 444, a validation component 446, and/or a system limitations component. The fault injection component 442 may be configured to determine a fault to inject into log data 430 of a vehicle. The fault injection component 442 may determine a magnitude and/or a duration associated with the fault. As discussed above, the magnitude and/or duration may be determined based on the component and/or subcomponent associated with the fault, a factory and/or manufacturer setting associated therewith, a type of fault (e.g., step, ramp, staleness, noise, etc.), or the like. The fault injection component 442 may determine a series of faults to inject in an iterative modification process. In such examples, the series may include an order of different faults to be injected and/or the order of increasing and/or decreasing magnitudes associated therewith.

The simulation component 444 may be configured to generate a simulation for evaluating a component and/or subcomponent of the vehicle controller. The simulation may include a simulation of a particular component, such as the localization component and/or a vehicle simulation, such as a simulation associated with a planner component, a tracker component, one or more system controller(s) 426, and the like, representative of a vehicle action based on the fault. The simulation component 444 may be configured to determine an output of each component and/or subcomponent based on the injected fault and/or a difference between the log data and the output. In various examples, the simulation component 444 may be configured to determine an error signal based on the difference between the log data and the output based on the injected fault.

The validation component 446 may be configured to validate the component and/or subcomponent evaluated based on results of a plurality of simulations associated with a plurality of faults. In some examples, the validation component 446 may determine a number of iterations of simulations and/or different faults to be tested in an evaluation of a particular component and/or associated subcomponent. In some examples, the number of iterations may be pre-determined based on the particular component and/or associated subcomponent. In some examples, the number of iterations may include a fixed number of faults to be injected for each input and/or output of the particular component and/or associated subcomponent.

The system limitations component 448 may be configured to determine a threshold fault detection time associated with a particular fault. As discussed above, the threshold fault detection time may be determined based on one or more operating parameters of a vehicle. In some examples, the threshold fault detection time may include a time associated with an exceedance of an operating parameter. In some examples, the threshold fault detection time may include the time associated with the exceedance minus a safety buffer, such as to ensure the vehicle does not exceed the operating parameter.

In various examples, the computing device(s) 434 may include one or more input/output (I/O) devices, such as via one or more interfaces 450. The interface(s) 450 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view a user interfaces associated with the evaluation component 440, such as to input data and/or view results via one or more interface(s) 450. In such examples, the interface(s) 450 may include one or more displays. Depending on the type of computing device, such as a user computing device, server computing device, or the like, the display may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphical user interface presented on the display. Accordingly, examples herein are not limited to any particular display technology.

The processor(s) 416 of the vehicle 402 and the processor(s) 438 of the computing device(s) 434 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 432 are examples of non-transitory computer-readable media. The memory 418 and 432 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 432 may include at least a working memory and a storage memory. For example, the working memory may be a high-speed memory of limited capacity (e.g., cache memory) that is used for storing data to be operated on by the processor(s) 416 and 438. In some instances, the memory 418 and 432 may include a storage memory that may be a lower-speed memory of relatively large capacity that is used for long-term storage of data. In some cases, the processor(s) 416 and 438 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 434 and/or components of the computing device(s) 434 may be associated with the vehicle 402. That is, the vehicle 402 may perform one or more of the functions associated with the computing device(s) 434, and vice versa.

Figure 5:
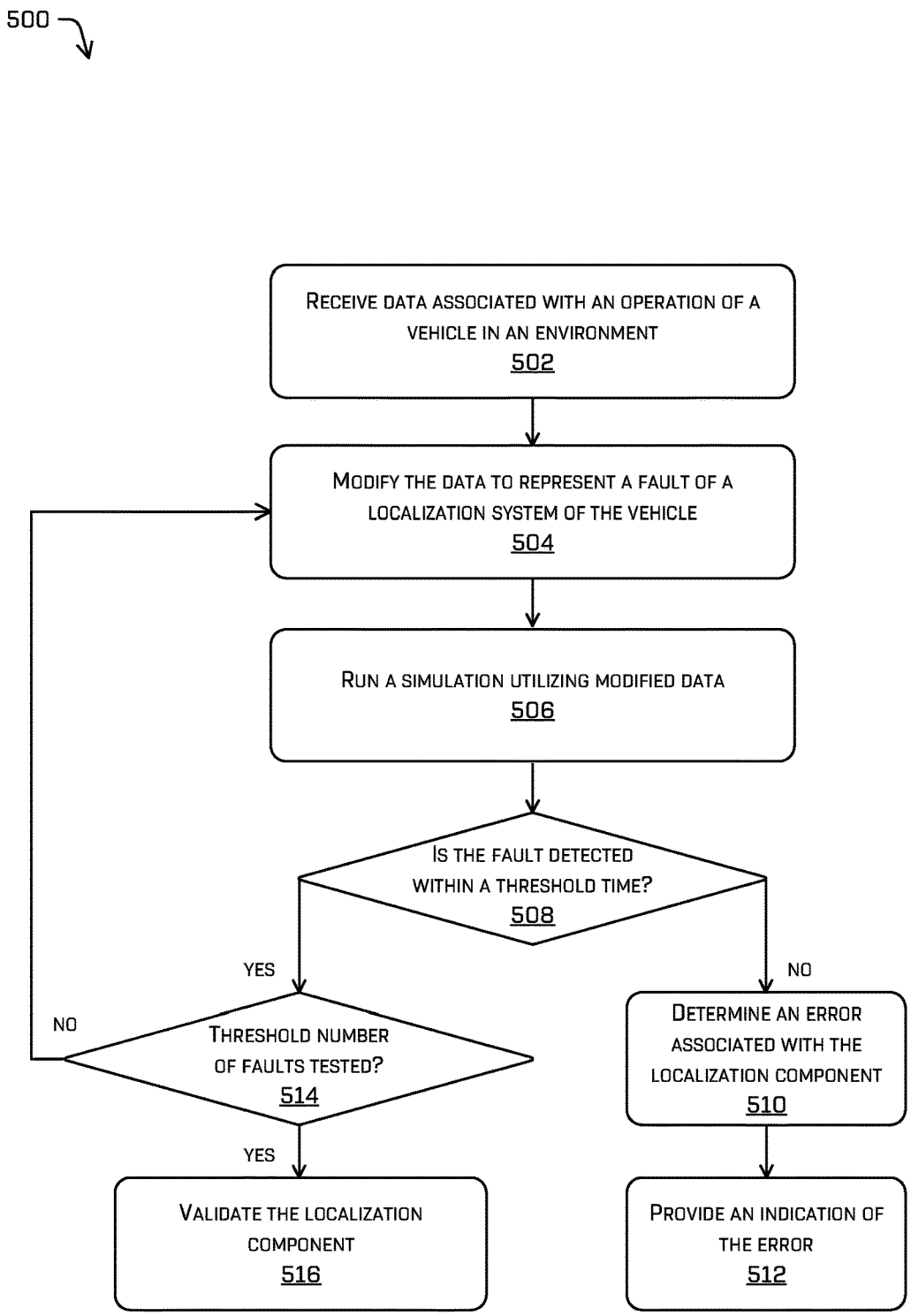
FIG. 5 depicts an example process for validating a localization component associated with a vehicle controller, in accordance with examples of the disclosure.
Figure 6:
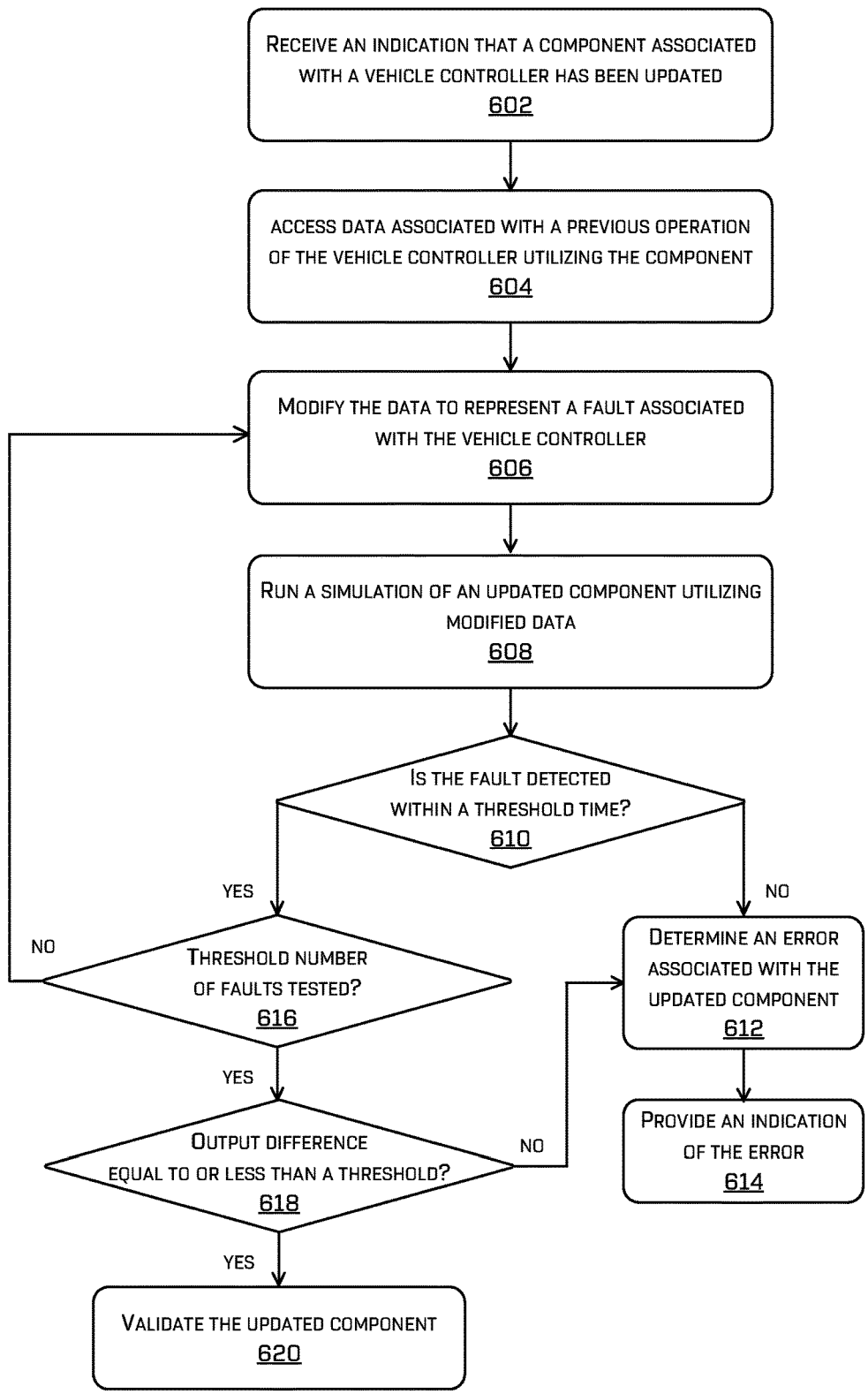
FIG. 6 depicts an example process for testing a component associated with a vehicle controller based on a determination that the component has been updated, in accordance with examples of the disclosure.
Figure 7:
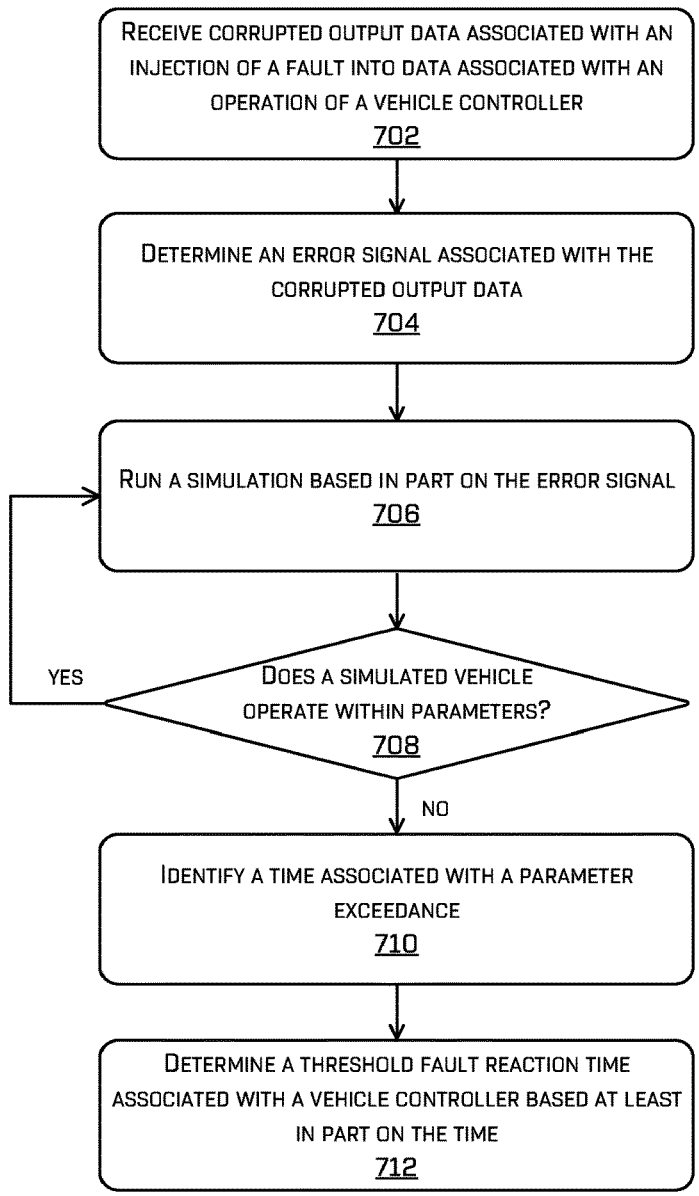
FIG. 7 depicts an example process for determining an operating limitation associated with a vehicle controller, in accordance with examples of the disclosure.

FIGS. 5-7 illustrate example processes in accordance with examples of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 5 depicts an example process 500 for validating a localization component associated with a vehicle controller, in accordance with examples of the disclosure. For example, some or all of the process 500 may be performed by one or more components in FIG. 4, as described herein. For example, some or all of the process 500 may be performed by the evaluation component 440.

At operation 502, the process 500 includes receiving data (e.g., log data) associated with an operation of a vehicle in an environment. In various examples, the data may include log data associated with the operation of a vehicle controller controlling the vehicle. That is, the data may include data processed by one or more components of a vehicle controller. In some examples, the data may include one or more resulting states of the vehicle based on the processed data. For example, the data may include actual vehicle trajectories, object trajectories, object interactions, and the like.

In various examples, an evaluation computing system may receive the data from a vehicle computing system of the vehicle, such as periodically, or continuously in real-time or near real-time. In such examples, the evaluation computing system may store the data in a datastore. In various examples, a remote computing device associated with the evaluation computing system, such as computing device(s) 434 may receive the data from the vehicle computing system and store the data in the associated datastore. In such examples, the evaluation computing system may access the data stored in the datastore, such as during an evaluation of a vehicle controller or associated component.

In some examples, the evaluation computing system may receive the data responsive to a request to validate (e.g., evaluate a performance of) a vehicle controller and/or associated component. In some examples, the evaluation computing system may receive the request to validate the vehicle controller and/or associated component and may access the data stored in a datastore.

In some examples, the request may include a request to validate operation of the vehicle controller in a particular scenario. In such examples, the data may be associated with the particular scenario. The scenario may include a straight road, a curved (e.g., left curve, right curve, degree of curve, etc.), cambered road, smooth road, rough road, a hill (e.g., uphill operation, downhill operation, etc.), a junction (e.g., intersection), object interactions (e.g., detection and reaction to objects), highway operations (e.g., above a threshold speed), urban operations, or the like. In some examples, absent receiving the particular scenario to be tested, the evaluation computing system may utilize data associated with a previous operation of the vehicle in a default scenario, such as on a straight, smooth road.

At operation 504, the process 500 includes modifying the data to represent a fault of a localization component of the vehicle. The evaluation computing system may modify the data by changing a value associated with an input or output of a subcomponent of the localization, the different value being representative of the fault. For example, the modified data may include a modification to sensor data captured by a sensor of the vehicle and indicative of a failure of the sensor. The evaluation computing system may utilize the modified data to evaluate the performance of the localization component in detecting the sensor failure. For another example, the modified data may include a modification to an output of a state solver of the localization component that is indicative of an error in a determined location of the vehicle. The evaluation computing system may utilize the modified data to determine a time required to detect and/or mitigate the fault by one or more components of the vehicle controller downstream of the localization component.

The evaluation computing system may determine a magnitude and/or a duration of the fault. The duration may include a time that the fault is applied (e.g., duration of input or output of faulty data). In some examples, the duration may be based on the particular subcomponent associated with the fault. The magnitude may include a value associated with the fault. In some examples, the magnitude may be determined based on a scale of error associated with the fault. For example, a first magnitude may represent a large error associated with a sensor output (e.g., input into a localization component) and a second magnitude may represent a smaller error associated with the sensor output.

In some examples, the magnitude may be determined based on the subcomponent of the localization component associated with the fault. For example, the evaluation computing system may modify the data to inject a constant offset in an IMU yaw rate of 1.5 degrees per second. In such an example, the magnitude of the fault may be 1.5 degrees per second. For another example, the evaluation computing system may modify the data to inject a lateral drift in a smooth position solver of the localization component of 0.15 meters per second. Though these are merely illustrative examples and are not intended to be so limiting.

In some examples, the magnitude of the injected fault may be determined based on a type of fault being introduced. The evaluation computing system may be configured to introduce step faults (e.g., step increase or decrease in magnitude), ramp faults (e.g., gradual increase or decrease in magnitude), component failures (e.g., staleness), and/or noise. The evaluation computing system may determine the magnitude and/or duration based on the determined type of fault, such as based on a value associated with a previous iteration, whether the modification is an initial modification, or the like.

At operation 506, the process 500 includes running a simulation utilizing the modified data. The simulation may include a simulation of the vehicle controller controlling a simulated vehicle through the environment. In some examples, the simulation may include a first simulation associated with the localization component and a second simulation associated with other components of the vehicle controller downstream of the localization component, such as the planner component, trajectory tracker, controllers, and the like. In such examples, the evaluation computing system may be configured to isolate the component being tested (i.e., the localization component) in the first simulation and then provide the simulation data to the second simulation. In some examples, the isolation of the component being tested may enable the evaluation computing system to rerun modified data through a particular subcomponent based on an injected fault, to determine a holistic effect of the fault on the system. For example, as described above with respect to FIG. 2, the smooth position solver may receive a correction signal from a global position solver, such as to correct for biases associated with inertial sensors. The evaluation computing system may introduce a fault in the correction signal by modifying log data associated therewith. The evaluation computing system may then rerun a simulation associated with the smooth position solver with the corrupted data, such as to determine a time associated with detection of the fault.

At operation 508, the process 500 includes determining whether the fault is detected within a threshold time. In various examples, the evaluation computing system may determine the threshold time based on the fault introduced. In some examples, the evaluation computing system may determine the threshold time based on the component and/or subcomponent being evaluated. In various examples, the evaluation computing system may determine the threshold time based on one or more operating parameters of the vehicle. In at least one example, the evaluation computing system may determine the threshold time utilizing the techniques described above in FIG. 3.

Based on a determination that the fault is not detected within the threshold time ("No" at operation 508), the process 500 at operation 510, includes determining an error associated with the localization component. In various examples, the evaluation computing system may provide an indication of the error via a computing device, such as via a user interface. In some examples, the indication of the error may include an indication of invalidity, such as indication of invalidity 146 of the localization component. In various examples, the evaluation computing system may additionally cause results (e.g., metrics, differences, etc.) associated with the evaluation to be provided to via the computing device, such as via the user interface or via a document, report, or the like. In some examples, the metrics may be used to improve one or more components of the vehicle controller.

At operation 512, the process 500 includes providing an indication of the error. In some examples, the evaluation computing system may cause the indication of the error to be presented via a user computing device, such as on a user interface thereof. In some examples, the indication of the error may include evaluation results indicating that the fault was not detected within the threshold time. In some examples, the evaluation results may include processed data associated with each component and/or subcomponent of the localization component and/or the associated vehicle controller. In some examples, the evaluation results may include a comparison of the actual operation of the vehicle and/or components thereof to the operation of the localization component and/or vehicle controller in the simulation.

Based on a determination that fault is detected within the threshold time ("Yes" at operation 508), the process 500 at operation 514, includes determining whether a threshold number of faults are tested. As discussed above with respect to FIG. 2, the evaluation of the localization component may include a plurality of faults of different magnitudes associated with a plurality of subcomponents of the localization component. In various examples, the evaluation computing system may determine the threshold number of faults based on an update to the localization component. For example, the evaluation computing system may determine that a particular subcomponent of the localization component has been updated. The evaluation computing system may determine the number of faults (e.g., number of iterations of simulations) to be performed in the evaluation of the localization component. In various examples, the threshold number may be determined based on the type(s) of faults introduced and characteristics of the particular subcomponents tested. In some examples, the threshold number may include a pre-determined maximum number of iterations (e.g., different magnitudes and/or durations) associated with a test of each subcomponent of the localization component. In some examples, the indication of the error may include an indication of invalidity associated with the localization component and/or the vehicle controller, such as indication of invalidity 146.

Based on a determination that the threshold number of faults have not been tested ("No" at operation 514), the process 500 returns to operation 504 to iteratively modify the data to represent a second fault of the localization component of the vehicle. In some examples, the evaluation computing system may be configured to iteratively modify the data at different magnitudes, such as to represent the step fault, the ramp fault, the component failure, and/or the noise (e.g., increasing or decreasing amount). In such examples, the evaluation computing system may determine the magnitude for a particular modification based on a previous modification and/or a type of fault (e.g., step, ramp, staleness, noise, etc.). For example, the evaluation computing system may determine to introduce a ramp fault in a wheel speed sensor. A first modification may include an increase in a particular wheel speed by 0.1 meters per second. The evaluation computing system may generate first modified data by modifying a value of the data associated with the particular wheel by increasing the value by 0.1. The evaluation computing system may then, in a second iterative test, generate second modified data by modifying a value of the data associated with the particular wheel by increasing the value by 0.15 (0.05 meters per second greater than the first modified data). For another example, the evaluation computing system may determine to introduce a step fault in an inertial measurement unit (IMU). The evaluation computing system may generate modified data by modifying values of the data associated with the IMU by 2.

In various examples, the evaluation computing system may be configured to sweep through different magnitudes of faults associated with various subcomponents, such as in iterative modifications to the data. In some examples, the different magnitudes may be determined based on the simulated failing subcomponent. For example, an IMU may include a self-report error value at or above which the IMU will generate an error message indicating the failing component. The evaluation computing system may determine to iteratively test faults of the IMU at values above zero and below the self-report error value. In some examples, the evaluation computing system may increase values in a stepwise function throughout the iterative modifications to the data.

Based on a determination that the threshold number of faults have been tested ("Yes" at operation 514), the process 500, at operation 516, includes validating the localization component. In various examples, the evaluation computing system may output an indication of validity, such as indication of validity 160, for view by a user associated with the evaluation computing system. In some examples, the evaluation computing system may cause the indication of validity to be presented via the user interface. In various examples, based on a validation of the localization component, the evaluation computing system may cause the localization component to be transmitted to one or more vehicles, such as to be incorporated into respective vehicle controllers. In various examples, the evaluation computing system may additionally cause results (e.g., metrics, differences, etc.) associated with the evaluation to be provided to the user, such as via the user interface or via a document, report, or the like.

FIG. 6 depicts an example process 600 for testing a component associated with a vehicle controller based on a determination that the component has been updated, in accordance with examples of the disclosure. For example, some or all of the process 600 may be performed by one or more components in FIG. 4, as described herein. For example, some or all of the process 600 may be performed by the evaluation component 440.

At operation 602, the process 600 includes receiving an indication that a component associated with a vehicle controller has been updated. In various examples, an evaluation computing system may receive the indication in a request to evaluate the component. In such examples, the evaluation computing system may receive the request to evaluate the component via an interface associated with the evaluation computing system or from a remote computing device, such as a user computing device associated with a user.

In various examples, the evaluation computing system may receive the indication that the component has been updated based on an instruction to evaluate the controller and/or associated component on a periodic basis (e.g., every 12 hours, daily, weekly, etc.). In such examples, the instruction may include the indication that the component has been updated.

At operation 604, the process 600 includes accessing data associated with a previous operation of the vehicle controller utilizing the component. The data may include log data associated with a historical operation of the vehicle operating in an environment. In some examples, the data may include data associated with a simulation run utilizing the previous version of the vehicle controller (e.g., vehicle controller with the previous version of the component). In such examples, the simulation results (e.g., locations of the vehicle, determined trajectories, etc.) associated with a previous simulation representative of the previous version of vehicle controller may be used as reference data in an evaluation of an updated version of the vehicle controller.

As discussed above, the data may include data associated with a previous operation of the vehicle controller controlling the vehicle in the environment. In some examples, based on the updated component, the evaluation computing system may access data associated with a particular scenario, such as a curved road, a smooth road, a cambered road, an object interaction, or the like.

At operation 606, the process 600 includes modifying the data to represent a fault associated with the vehicle controller. In various examples, the fault may be associated with the updated component. In some examples, the fault may be associated with another component that provides data to the updated component, such as to determine a performance of the updated component in detecting the introduced fault. As described above, the evaluation system may modify a value associated with the data representative of the fault by a particular amount (e.g., magnitude of the fault) and/or may apply the modified data for a time (e.g., duration of the fault). The magnitude and/or the duration of the fault may be determined utilizing one or more techniques described above.

At operation 608, the process 600 includes running a simulation of the updated component utilizing the modified data. The simulation may include a simulation of the particular component that was updated and/or other components associated with the vehicle controller downstream of the updated component (e.g., configured to receive data from the updated component).

At operation 610, the process 600 includes determining whether the fault is detected within a threshold time. In various examples, the evaluation computing system may determine the threshold time based on the fault introduced. In some examples, the evaluation computing system may determine the threshold time based on the component and/or subcomponent being evaluated. In various examples, the evaluation computing system may determine the threshold time based on one or more operating parameters of the vehicle. In at least one example, the evaluation computing system may determine the threshold time utilizing the techniques described above in FIG. 3.

Based on a determination that the fault is not detected within the threshold time ("No" at operation 610), the process 600, at operation 612, includes determining an error associated with the updated component. In various examples, the evaluation computing system may provide an indication of the error via a computing device, such as via a user interface. In some examples, the indication of the error may include an indication of invalidity, such as indication of invalidity 146 of the updated component. In various examples, the evaluation computing system may additionally cause results (e.g., metrics, differences, etc.) associated with the evaluation to be provided to via the computing device, such as via the user interface or via a document, report, or the like. In some examples, the metrics may be used to improve one or more components of the vehicle controller.

At operation 614, the process includes providing an indication of the error. In some examples, the evaluation computing system may cause the indication of the error to be presented via a user computing device, such as on a user interface thereof. In some examples, the indication of the error may include evaluation results indicating that the fault was not detected within the threshold time. In some examples, the evaluation results may include processed data associated with each component and/or subcomponent of the localization component and/or the associated vehicle controller. In some examples, the evaluation results may include a comparison of the actual operation of the vehicle and/or components thereof to the operation of the updated component and/or vehicle controller in the simulation. In some examples, the indication of the error may include an indication of invalidity associated with the updated component and/or the vehicle controller, such as indication of invalidity 146.

Based on a determination that fault is detected within the threshold time ("Yes" at operation 610), the process 600, at operation 616, includes determining whether a threshold number of faults are tested. As discussed above with respect to FIG. 2, the evaluation of the localization component may include a plurality of faults of different magnitudes associated with a plurality of subcomponents of the localization component. In various examples, the evaluation computing system may determine the threshold number of faults based on the updated component and/or subcomponent thereof. For example, the evaluation computing system may determine that perception component of the vehicle controller has been updated. The evaluation computing system may determine the number of faults (e.g., number of iterations of simulations) to be performed in the evaluation of the perception system, such as based on the different sensor inputs input and processed by the perception system. In various examples, the threshold number may be determined based on the type(s) of faults introduced and characteristics of the particular subcomponents tested. In some examples, the threshold number may include a pre-determined maximum number of iterations (e.g., different magnitudes and/or durations) associated with a test of the updated component and/or subcomponents thereof.

Based on a determination that the threshold number of faults have not been tested ("No" at operation 616), the process 600 returns to operation 606 to iteratively modify the data to represent a second fault associated with the vehicle controller. In some examples, the evaluation computing system may be configured to iteratively modify the data at different magnitudes, such as to represent the step fault, the ramp fault, the component failure, and/or the noise (e.g., increasing or decreasing amount). In such examples, the evaluation computing system may determine the magnitude for a particular modification based on a previous modification and/or a type of fault (e.g., step, ramp, staleness, noise, etc.). In various examples, the evaluation computing system may be configured to sweep through different magnitudes of faults associated with the updated component and/or subcomponents thereof, such as in iterative modifications to the data.

Based on a determination that the threshold number of faults have been tested ("Yes" at operation 616), the process 600, at operation 618, includes determining whether a difference between an output of the autonomous controller and an output associated with a previous version of the autonomous controller is equal to or less than a threshold difference. In some examples, the difference in the output may represent a performance of the autonomous controller (e.g., performance of updated version versus previous version). In various examples, the difference in the output between the autonomous controller (e.g., updated version) and the previous version thereof may represent one or more regressions in performance of the autonomous controller and/or the updated component. In some examples, the evaluation computing system may be configured to identify a particular subcomponent of the updated component associated with the regression(s). In some examples, the evaluation computing system may be configured to provide an indication of the regression(s) associated with the updated component and/or subcomponent thereof. In some examples, the regression(s) may be analyzed to determine additional updates to be performed with respect to the updated component.

Based on a determination that the difference in the output between the autonomous controller and the previous version thereof exceeds the threshold difference ("No" at operation 618), the process 600 determines an error associated with the updated component, as described with respect to operation 612.

Based on a determination that the difference in the output between the autonomous controller and a previous version of the autonomous controller is within the threshold ("Yes" at operation 618), the process 600, at operation 620 includes validating the updated component. In various examples, the evaluation computing system may output an indication of validity, such as indication of validity 160, for view by a user associated with the evaluation computing system. In some examples, the evaluation computing system may cause the indication of validity to be presented via the user interface. In various examples, based on a validation of the updated component, the evaluation computing system may cause the updated component to be transmitted to one or more vehicles, such as to be incorporated into respective vehicle controllers. In various examples, the evaluation computing system may additionally cause results (e.g., metrics, differences, etc.) associated with the evaluation to be provided to the user, such as via the user interface or via a document, report, or the like.

FIG. 7 depicts an example process 700 for determining an operating limitation associated with a vehicle controller, in accordance with examples of the disclosure. For example, some or all of the process 700 may be performed by one or more components in FIG. 4, as described herein. For example, some or all of the process 700 may be performed by the evaluation component 440.

At operation 702, the process 700 includes receiving corrupted output data associated with an injection of a fault into data associated with an operation of a vehicle controller controlling a vehicle in an environment, such as corrupted output data 318. As discussed above, the fault may be injected into log data associated with the operation of the vehicle controller, such as data processed by one or more components of the vehicle controller. In some examples, the corrupted output data may represent an output of a component and/or subcomponent of the vehicle controller based on the fault. In other words, the corrupted output data may include data processed by the component and/or subcomponent based on modified log data (e.g., log data modified to include the fault).

At operation 704, the process 700 includes determining an error signal associated with the corrupted output data, such as error signal 322. As discussed above, the error signal may include a difference between the log data (e.g., reference data, such as reference data 316) and the corrupted output data. In various examples, the error signal may represent a difference in performance of a component and/or subcomponent of the vehicle controller based on the injection of the fault.

At operation 706, the process 700 includes running a simulation based in part on the error signal. The simulation may include a simulation of the vehicle controller controlling a simulated vehicle through a simulated environment. In various examples, the error signal may be injected into the simulation with the vehicle controller controlling the simulated vehicle, such as to determine a deviation in behavior of the vehicle controller and/or the simulated vehicle in response to the error signal (e.g., in response to the injected fault).

In some examples, the simulation may include a first simulation associated with the component being tested, such as to determine a total error associated with an output thereof. In some examples, the simulation may include a second simulation associated with other components of the vehicle controller downstream of the component, such as the planner component, trajectory tracker, controllers, and the like. In such examples, the evaluation computing system may be configured to isolate the component being tested (i.e., the localization component) in the first simulation and then provide the simulation data to the second simulation configured to determine vehicle operations based on corrupted data.

At operation 708, the process 700 includes determining whether the simulated vehicle operates within parameters. The parameters may include one or more operating parameters associated with the vehicle, such as predetermined parameters to ensure a safe operation of the vehicle. For example, an operating parameter may include maintaining a position within 40 centimeters of a center of a lane. For another example, an operating parameter may include maintaining a speed associated with a determined trajectory within 0.5 meters per second.

In various examples, the evaluation computing system determines whether the simulated vehicle operates within parameters by comparing processed modified data to the log data (e.g., what the vehicle actually did). In such examples, the log data may represent reference data and the evaluation computing system may determine one or more deviations from a location, orientation, speed, acceleration, or the like of the vehicle as it previously operated in the environment. In various examples, the evaluation system determines a deviation of the vehicle from the reference data. In some examples, the evaluation computing system determines whether the deviation meets or exceeds one or more of the operating parameters. In such examples, the operating parameters may be represented by a maximum deviation from the reference data.

Based on a determination that the simulated vehicle operates within operating parameters (e.g., deviation less than the threshold deviation) ("Yes" at operation 708), the evaluation computing system may continue to run the simulation, as described with regard to operation 706.

Based on a determination that the simulated vehicle meets or exceeds an operating parameter ("No" at operation 708), the process 700 includes, at operation 710, identifying a time associated with a parameter exceedance. The time may represent a length of time that the vehicle controller controls the simulated vehicle with the introduced fault until the simulated vehicle exceeds at least one operating parameter.

At operation 712, the process 700, includes determining a threshold fault reaction time based at least in part on the time. The threshold fault reaction time may include a threshold fault detection time or a threshold fault mitigation time, as described above. The threshold fault reaction time may include the time minus a safety buffer time, such as to ensure the safe operation of the vehicle. The safety buffer time may include a pre-determined time (e.g., 0.05 seconds, 0.1 seconds, 0.2 seconds, etc.) that is applied to the time associated with the parameter exceedance. In some examples, the safety buffer time may be dynamically determined by the evaluation computing system, such as based on the component being evaluated, the fault (e.g., type, magnitude, duration, associated component and/or subcomponent, associated sensor, etc.). For example, the fault be associated with a prediction system predicting a pedestrian trajectory and potential interaction with the pedestrian based on the pedestrian trajectory. Due in part with the potential interaction between the vehicle and the pedestrian, the safety buffer time associated with the pedestrian interaction may be greater than another safety buffer time associated with an object interaction with another vehicle.

In various examples, the evaluation computing system may store the threshold fault reaction time in association with the fault and/or the vehicle controller, such as for future evaluations associated with a performance of the vehicle controller and/or a component or subcomponent thereof.

Example Clauses

A: A system comprising: one or more processors; and memory storing processor-executable instructions that, when executed by the one or more processors, configure the system to: access log data associated with a vehicle operating in a physical environment, wherein the vehicle is at least partially controlled by a controller; modify the log data to generate modified data representative of a fault associated with the controller; determine, based at least in part on the modified data, an error signal associated with the fault; iteratively performing simulations based at least in part on the error signal to determine a threshold reaction time, wherein the iteratively performed simulations include the controller configured for autonomous operation of a first simulated vehicle and wherein the threshold reaction time is a first time associated with a deviation of the first simulated vehicle being equal to a safety margin; perform an additional simulation based at least in part on the modified data, wherein the additional simulation includes the controller configured for autonomous operation of a second simulated vehicle and wherein the additional simulation includes a simulated environment; determine, based at least in part on the additional simulation, a second time associated with a reaction of the controller to the fault; and based at least in part on determining that the second time associated with the reaction is equal to or less than the threshold reaction time, validating the controller.

B: The system of paragraph A, wherein the instructions further configure the system to: receive an indication that a component of the controller has been updated; generate, based on an update to the controller, second modified data representative of a second fault associated with the update; perform another simulation based at least in part on the second modified data; based at least in part on determining that the controller comprising the update does not react to the second fault within a second threshold time, determine that the update is invalid; and output an indication of invalidity of at least one of the update or the component.

C: The system of either paragraph A or paragraph B, wherein the reaction to the fault comprises at least one of: a detection of the fault; or a mitigation of the fault.

D: The system of any one of paragraphs A-C, wherein the instructions further configure the system to: determine an update to the controller to be evaluated, wherein the update comprises a modification to a subcomponent of the controller; and determine at least one of a type, a magnitude, or a duration of the fault based at least in part on the subcomponent and the modification to the subcomponent.

E: The system of any one of paragraphs A-D, wherein a fault type associated with the fault includes at least one of: a step fault; a ramp fault; a component failure; or noise, wherein at least one of a magnitude or duration of the fault is determined based at least in part on the fault type.

F: A method comprising: accessing data associated with an operation of a vehicle in an environment, wherein the vehicle is at least partially controlled by a controller during the operation; modifying the data to generate modified data representative of a fault associated with the controller; performing a simulation based at least in part on the modified data, wherein the simulation includes the controller configured for autonomous operation of a simulated vehicle; and based on characterizing the controller's reaction to the fault in the simulation within a threshold time, validating the controller.

G: The method of paragraph F, wherein the reaction to the fault comprises at least one of: a detection of the fault; or a mitigation of the fault.

H: The method of either paragraph F or paragraph G, further comprising: receiving an indication that a component of the controller has been updated; generating, based on an update to the controller, second modified data representative of a second fault associated with the update; performing a second simulation based at least in part on the second modified data; based at least in part on determining that the controller comprising the update does not react to the second fault within a second threshold time, determining that the update is invalid; and outputting an indication of invalidity of at least one of the update or the component.

I: The method of any one of paragraphs F-H, further comprising: determining an update to a component of the controller; and determining at least one of a magnitude or a duration of the fault based at least in part on the update to the component.

J: The method of any one of paragraphs F-I, further comprising: determining, based at least in part on the modified data, an error signal associated with the fault; iteratively performing simulations, wherein a magnitude associated with the fault is varied between the iteratively performed simulations; comparing a deviation of the simulated vehicle in the iteratively performed simulations to a safety margin, wherein the deviation is based at least in part on the fault being varied; and determining that the deviation is equal to the safety margin, wherein the threshold time is based at least in part on a time associated with the deviation being equal to the safety margin.

K: The method of any one of paragraphs F-J, further comprising: receiving a request to validate the controller; and identifying a scenario associated with the request, wherein the data is associated with the operation of the vehicle in the scenario.

L: The method of any one of paragraphs F-K, further comprising, receiving a request to evaluate a performance of a localization system of the controller, wherein the fault is associated with at least one of: sensor data associated with a sensor of the vehicle; a global position output associated with a global position solver; a smooth position output associated with a smooth position solver; a correction signal associated with the global position solver and the smooth position solver; or a state solver position output.

M: The method of any one of paragraphs F-L, wherein the fault comprises a fault type comprising at least one of: a step fault; a ramp fault; a component failure; or noise, wherein at least one of a magnitude or duration of the fault is determined based at least in part on the fault type.

N: The method of any one of paragraphs F-M, wherein the modified data is first modified data, the fault is a first fault, the simulation is a first simulation, the method further comprising: determining a second fault associated with the controller; generating second modified data representative of the second fault, wherein the second modified data is different from the first modified data; performing the simulation based at least in part on the second modified data; and determining that the controller reacts to the second fault in the simulation within the threshold time, wherein validating the controller is based at least in part on the controller reacting to the second fault within the threshold time.

O: A system or device comprising: a processor; and a non-transitory computer-readable medium storing instructions that, when executed, cause a processor to perform a computer-implemented method as any one of paragraphs F-N describe P: A system or device comprising: a means for processing; and a means for storing coupled to the means for processing, the means for storing including instructions to configure one or more devices to perform a computer-implemented method as any one of paragraphs F-N describe Q: One or more non-transitory computer-readable media storing instructions executable by a processor, wherein the instructions, when executed, cause the processor to perform operations comprising: accessing data associated with an operation of a vehicle in an environment, wherein the vehicle is at least partially controlled by a controller during the operation; modifying the data to generate modified data representative of a fault associated with the controller; performing a simulation based at least in part on the modified data, wherein the simulation includes the controller configured for autonomous operation of a simulated vehicle; and performing at least one of: based at least in part on determining that the controller reacts to the fault in the simulation within a threshold time, validating the controller; or based at least in part on determining that the controller does not react to the fault in the simulation within the threshold time, determining that the controller is invalid.

R: The one or more non-transitory computer-readable media of paragraph Q, the operations further comprising: determining an update to a component of the controller; and determining a parameter of the fault based at least in part on the update to the component.

S: The one or more non-transitory computer-readable media of either paragraph Q or paragraph R, the operations further comprising: receiving a request to validate the controller; and identifying a scenario associated with the request, the scenario being associated with at least one of: a curvature of a road; a smoothness of the road; a camber of the road; or a vehicle speed, wherein the data is associated with the operation of the vehicle in the scenario.

T: The one or more non-transitory computer-readable media of any one of paragraphs Q-S, the operations further comprising: determining, based at least in part on the modified data, an error signal associated with the fault; iteratively performing simulations, wherein a magnitude associated with the fault is varied between the iteratively performed simulations; comparing a deviation of the simulated vehicle in the iteratively performed simulations to a safety margin, wherein the deviation is based at least in part on the fault being varied; and determining that the deviation is equal to the safety margin, wherein the threshold time is based at least in part on a time associated with the deviation being equal to the safety margin.

U: The one or more non-transitory computer-readable media of any one of paragraphs Q-T, wherein the threshold time comprises at least one of: a threshold fault detection time associated with detecting the fault; or a threshold fault mitigation time associated with mitigating the fault.

V: The one or more non-transitory computer-readable media of any one of paragraphs Q-U, the operations further comprising providing one of: an indication of validity based at least in part on determining that the fault is detected within a threshold detection time; or an indication of invalidity based at least in part on determining that the fault is not detected within the threshold detection time.

While the example clauses described above are described with respect to one particular implementation, it should be understood that, in the context of this document, the content of the example clauses can also be implemented via a method, device, system, a computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
memory storing processor-executable instructions that, when executed by the one or more processors, configure the system to:
access log data associated with a vehicle operating in a physical environment, wherein the vehicle is at least partially controlled by a controller;
generate modified data at least in part by modifying the log data, the modified data being representative of a fault associated with the controller indicating one or more deviations from a location, an orientation, a speed, or an acceleration represented by the log data;
determine, based at least in part on the modified data, an error signal associated with the fault;
iteratively perform simulations based at least in part on the error signal to determine a threshold reaction time, wherein the iteratively performed simulations include the controller configured for autonomous operation of a first simulated vehicle in a simulated environment and wherein the threshold reaction time is a first time associated with a deviation of the first simulated vehicle being equal to a safety margin;
perform an additional simulation based at least in part on the modified data, wherein the additional simulation includes the controller configured for autonomous operation of a second simulated vehicle and wherein the additional simulation includes a simulated environment;
determine, based at least in part on the additional simulation, a second time associated with a reaction of the controller to the fault; and
based at least in part on determining that the second time associated with the reaction of the controller to the fault is equal to or less than the threshold reaction time, validate the controller.

2. The system of claim 1, wherein the instructions further configure the system to:
receive an indication that a component of the controller has been updated;
generate, based on an update to the controller, second modified data representative of a second fault associated with the update;
perform another simulation based at least in part on the second modified data;
based at least in part on determining that the controller comprising the update does not react to the second fault within a second threshold time, determine that the update is invalid; and
output an indication of invalidity of at least one of the update or the component.

3. The system of claim 1, wherein the reaction of the controller to the fault comprises at least one of:
a detection of the fault; or
a mitigation of the fault.

4. The system of claim 1, wherein the instructions further configure the system to:
determine an update to the controller to be evaluated, wherein the update comprises a modification to a subcomponent of the controller; and determine at least one of a type, a magnitude, or a duration of the fault based at least in part on the subcomponent and the modification to the subcomponent.

5. The system of claim 1, wherein a fault type associated with the fault includes at least one of:
   a step fault;
   a ramp fault;
   a component failure; or
   noise,
   wherein at least one of a magnitude or duration of the fault is determined based at least in part on the fault type.

6. A method comprising:
   accessing data associated with an operation of a vehicle in an environment, wherein the vehicle is at least partially controlled by a controller during the operation;
   generating modified data at least in part by modifying the data, the modified data being representative of a fault associated with the controller indicating one or more deviations from a location, an orientation, a speed, or an acceleration represented by the data;
   performing a simulation based at least in part on the modified data, wherein the simulation includes the controller configured for autonomous operation of a simulated vehicle in a simulated environment; and
   based on characterizing the controller's reaction to the fault in the simulation within a threshold time, validating the controller.

7. The method of claim 6, wherein the controller's reaction to the fault comprises at least one of:
   a detection of the fault; or
   a mitigation of the fault.

8. The method of claim 6, further comprising:
   receiving an indication that a component of the controller has been updated;
   generating, based on an update to the controller, second modified data representative of a second fault associated with the update;
   performing a second simulation based at least in part on the second modified data;
   based at least in part on determining that the controller comprising the update does not react to the second fault within a second threshold time, determining that the update is invalid; and
   outputting an indication of invalidity of at least one of the update or the component.

9. The method of claim 6, further comprising:
   determining an update to a component of the controller; and
   determining at least one of a magnitude or a duration of the fault based at least in part on the update to the component.

10. The method of claim 6, further comprising:
    determining, based at least in part on the modified data, an error signal associated with the fault;
    iteratively performing simulations, wherein a magnitude associated with the fault is varied between the iteratively performed simulations;
    comparing a deviation of the simulated vehicle in the iteratively performed simulations to a safety margin, wherein the deviation is based at least in part on the fault being varied; and
    determining that the deviation is equal to the safety margin,
    wherein the threshold time is based at least in part on a time associated with the deviation being equal to the safety margin.

11. The method of claim 6, further comprising:
    receiving a request to validate the controller; and
    identifying a scenario associated with the request,
    wherein the data is associated with the operation of the vehicle in the scenario.

12. The method of claim 6, further comprising, receiving a request to evaluate a performance of a localization system of the controller, wherein the fault is associated with at least one of:
    sensor data associated with a sensor of the vehicle;
    a global position output associated with a global position solver;
    a smooth position output associated with a smooth position solver;
    a correction signal associated with the global position solver and the smooth position solver; or
    a state solver position output.

13. The method of claim 6, wherein the fault comprises a fault type comprising at least one of:
    a step fault;
    a ramp fault;
    a component failure; or
    noise,
    wherein at least one of a magnitude or duration of the fault is determined based at least in part on the fault type.

14. The method of claim 6, wherein the modified data is first modified data, the fault is a first fault, the simulation is a first simulation, the method further comprising:
    determining a second fault associated with the controller;
    generating second modified data representative of the second fault, wherein the second modified data is different from the first modified data;
    performing the simulation based at least in part on the second modified data; and
    determining that the controller reacts to the second fault in the simulation within the threshold time,
    wherein validating the controller is based at least in part on the controller reacting to the second fault within the threshold time.

15. One or more non-transitory computer-readable media storing instructions executable by a processor, wherein the instructions, when executed, cause the processor to perform operations comprising:
    accessing data associated with an operation of a vehicle in an environment, wherein the vehicle is at least partially controlled by a controller during the operation;
    generating modified data at least in part by modifying the data, the modified data being representative of a fault associated with the controller indicating one or more deviations from a location, an orientation, a speed, or an acceleration represented by the data;
    performing a simulation based at least in part on the modified data, wherein the simulation includes the controller configured for autonomous operation of a simulated vehicle in a simulated environment; and
    performing at least one of:
       based at least in part on determining that the controller reacts to the fault in the simulation within a threshold time, validating the controller; or
       based at least in part on determining that the controller does not react to the fault in the simulation within the threshold time, determining that the controller is invalid.

16. The one or more non-transitory computer-readable media of claim 15, the operations further comprising:
    determining an update to a component of the controller; and determining a parameter of the fault based at least in part on the update to the component.

17. The one or more non-transitory computer-readable media of claim 15, the operations further comprising:
receiving a request to validate the controller; and
identifying a scenario associated with the request, the scenario being associated with at least one of:
a curvature of a road;
a smoothness of the road;
a camber of the road; or
a vehicle speed,
wherein the data is associated with the operation of the vehicle in the scenario.

18. The one or more non-transitory computer-readable media of claim 15, the operations further comprising:
determining, based at least in part on the modified data, an error signal associated with the fault;
iteratively performing simulations, wherein a magnitude associated with the fault is varied between the iteratively performed simulations;
comparing a deviation of the simulated vehicle in the iteratively performed simulations to a safety margin, wherein the deviation is based at least in part on the fault being varied; and
determining that the deviation is equal to the safety margin,
wherein the threshold time is based at least in part on a time associated with the deviation being equal to the safety margin.

19. The one or more non-transitory computer-readable media of claim 15, wherein the threshold time comprises at least one of:
a threshold fault detection time associated with detecting the fault; or
a threshold fault mitigation time associated with mitigating the fault.

20. The one or more non-transitory computer-readable media of claim 15, the operations further comprising providing one of:
an indication of validity based at least in part on determining that the fault is detected within a threshold detection time; or
an indication of invalidity based at least in part on determining that the fault is not detected within the threshold detection time.

* * * * *